(12) United States Patent
Kahn et al.

(10) Patent No.: US 9,772,985 B2
(45) Date of Patent: Sep. 26, 2017

(54) COMMUNICATIONS CONTROL FOR RESOURCE CONSTRAINED DEVICES

(71) Applicant: Microsoft Corporation, Redmond, WA (US)

(72) Inventors: Jason Kahn, Seattle, WA (US); Weston Haught, Seattle, WA (US); Douglas Pearce, Seattle, WA (US); Cleve Littlefield, Kirkland, WA (US); Paul Elliott, Woodinville, WA (US); Jason F. Moore, Redmond, WA (US); Kim Manis, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 279 days.

(21) Appl. No.: 14/193,443

(22) Filed: Feb. 28, 2014

(65) Prior Publication Data
US 2015/0248389 A1    Sep. 3, 2015

(51) Int. Cl.
*G06F 17/00* (2006.01)
*G06F 17/24* (2006.01)
*H04L 12/18* (2006.01)
*H04L 12/58* (2006.01)

(52) U.S. Cl.
CPC ........ *G06F 17/241* (2013.01); *H04L 12/1813* (2013.01); *H04L 51/08* (2013.01); *H04L 51/18* (2013.01); *H04L 51/24* (2013.01); *H04L 51/16* (2013.01); *H04L 51/32* (2013.01)

(58) Field of Classification Search
CPC ....... H04L 51/24; H04L 12/581; H04L 51/26; G06F 17/241
See application file for complete search history.

(56) References Cited

U.S. PATENT DOCUMENTS

| | | | | |
|---|---|---|---|---|
| 7,509,385 | B1 * | 3/2009 | Rittmeyer | G06Q 10/107 709/206 |
| 7,512,652 | B1 * | 3/2009 | Appelman | G06Q 10/107 709/204 |
| 7,885,901 | B2 | 2/2011 | Hull et al. | |
| 8,060,573 | B2 | 11/2011 | Leonard | |

(Continued)

OTHER PUBLICATIONS

"International Search Report and Written Opinion Issued in PCT Patent Application No. PCT/US2015/017613", Mailed Date: May 15, 2015, 11 Pages.

(Continued)

*Primary Examiner* — Howard Cortes
(74) *Attorney, Agent, or Firm* — Holzer Patel Drennan

(57) ABSTRACT

A relationship-based communications service system receives a communication from a source destined to a recipient. The recipient is capable of receiving the communication at a computing device. The communication service system determines a first relationship type based on a satisfied relationship condition between the source and the recipient. The communications service system sends a relationship-qualified version of the communication to the recipient based on the determined first relationship type. The relationship-qualified version of the communication of the determined first relationship type is annotated to present a different user interface behavior to the recipient at the computing device than a relationship-qualified version of the communication of a second relationship type.

22 Claims, 19 Drawing Sheets

(56) References Cited

U.S. PATENT DOCUMENTS

| | | | |
|---|---|---|---|
| 8,447,967 B1* | 5/2013 | Janacek | H04L 63/0428 713/150 |
| 2005/0160292 A1* | 7/2005 | Batthish | H04L 12/58 726/5 |
| 2007/0014280 A1 | 1/2007 | Cormier et al. | |
| 2007/0203993 A1* | 8/2007 | Cai | H04L 12/581 709/206 |
| 2008/0148154 A1* | 6/2008 | Burrell | H04L 12/1895 715/733 |
| 2008/0182556 A1* | 7/2008 | Kozam | H04L 51/12 455/411 |
| 2008/0256602 A1* | 10/2008 | Pagan | H04L 12/581 726/3 |
| 2009/0037350 A1* | 2/2009 | Rudat | G06Q 10/107 706/11 |
| 2009/0132655 A1 | 5/2009 | Behrens | |
| 2009/0177744 A1* | 7/2009 | Marlow | G06Q 10/10 709/204 |
| 2009/0182832 A1 | 7/2009 | O'Sullivan et al. | |
| 2009/0210497 A1 | 8/2009 | Callanan et al. | |
| 2010/0030858 A1* | 2/2010 | Chasin | G06Q 10/107 709/206 |
| 2010/0281113 A1 | 11/2010 | Laine et al. | |
| 2010/0285843 A1* | 11/2010 | Appelman | H04L 12/5855 455/566 |
| 2011/0173274 A1* | 7/2011 | Sood | G06Q 10/10 709/206 |
| 2011/0184937 A1* | 7/2011 | Jin | G06Q 10/107 707/722 |
| 2012/0196581 A1 | 8/2012 | Papakipos et al. | |
| 2012/0198002 A1 | 8/2012 | Goulart et al. | |
| 2012/0214456 A1* | 8/2012 | Cho | H04M 3/42068 455/415 |
| 2012/0254229 A1* | 10/2012 | Raz | H04L 67/22 707/769 |
| 2012/0278388 A1* | 11/2012 | Kleinbart | G06Q 10/06 709/204 |
| 2013/0084835 A1* | 4/2013 | Scherzer | H04W 48/14 455/414.1 |
| 2013/0143608 A1* | 6/2013 | Lin | G06F 17/30705 455/466 |
| 2013/0166555 A1* | 6/2013 | Pfaff | H04M 1/274583 707/737 |
| 2013/0246449 A1* | 9/2013 | Balannik | G06Q 10/10 707/758 |
| 2013/0295973 A1 | 11/2013 | Kumaran et al. | |
| 2013/0316746 A1* | 11/2013 | Miller | H04L 51/30 455/466 |
| 2013/0326221 A1* | 12/2013 | Murphy | H04L 63/0428 713/168 |
| 2013/0339276 A1* | 12/2013 | Lai | G06Q 10/107 706/12 |
| 2013/0339436 A1* | 12/2013 | Gray | H04L 51/24 709/204 |
| 2014/0059693 A1* | 2/2014 | Stecher | H04L 63/0421 726/26 |
| 2014/0066063 A1* | 3/2014 | Park | H04L 67/26 455/435.1 |
| 2014/0188846 A1* | 7/2014 | Kurabayashi | G06F 17/30112 707/722 |
| 2014/0189030 A1* | 7/2014 | Benchenaa | H04L 51/26 709/207 |
| 2014/0229980 A1 | 8/2014 | Bill | |
| 2015/0024793 A1* | 1/2015 | Kaplinger | H04W 4/12 455/466 |
| 2015/0135096 A1* | 5/2015 | Dhara | H04L 65/403 715/753 |

OTHER PUBLICATIONS

"(iPhone) Get More Friends on Voxer", Published on: Jun. 26, 2013, Available at: https://support.voxer.com/entries/359394--iPhone-Get-More-Friends-on-Voxer.

Cozma, Nicole, "Stop strangers from contacting you on Facebook", Published on: Oct. 27, 2013, Available at: http://howto.cnet.com/8301-11310_39-57541558-285/stop-strangers-from-contacting-you-on-facebook/.

Shen, et al., "Latent Friend Mining from Blog Data", Published on: Dec. 18, 2006, Available at: http://making.csie.ndhu.edu.tw/seminar/2007/papers/PDF/Latent%20Friend%20Mining%20from%20Blog%20Data.pdf.

O'Connor, Morgan, "How to Stop Skype Spammers", Published on: Jul. 28, 2011, Available at: http://www.ehow.com/how_8598145_stop-skype-spammers.html.

"Second Written Opinion Issued in PCT Application No. PCT/US2015/017613", Mailed Date: Jan. 29, 2016, 6 Pages.

"International Preliminary Report on Patentability Issued in PCT Application No. PCT/US2015/017613", Mailed Date: May 13, 2016, 8 Pages.

* cited by examiner

COMMUNICATIONS CONTROL FOR RESOURCE CONSTRAINED DEVICES

BACKGROUND

Communication services can provide a variety of communication options between senders and recipients, including without limitation video calls, instant messaging and others. However, balancing ease of communication with protection against undesired communications (e.g., spam) is challenging.

SUMMARY

Implementations described and claimed herein relate to determining expected relationship types between senders and recipients based on available information and adjusting the user interface behavior with a relationship-qualified message upon receipt by the recipient.

A relationship-based communications service system receives a communication from a source destined to a recipient. The recipient is capable of receiving the communication at a computing device. The communication service system determines a first relationship type based on a satisfied relationship condition between the source and the recipient. The communications service system sending a relationship-qualified version of the communication to the recipient based on the determined first relationship type. The relationship-qualified version of the communication of the determined first relationship type is annotated to present a different user interface behavior to the recipient at the computing device than a relationship-qualified version of the communication of a second relationship type.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

In existing communications systems, such as video and/or instant messaging systems, it can be difficult to balance ease of starting communication with a desire to prevent spam and other undesirable communications on the network. One option is to close the network such that users are required to invite one another before they can communicate. Another option is to open the network completely to allow communication and to use cost proofs to prevent abuse. In various examples described herein, end user equipment and communications servers are adapted to enable a trade-off between participating in potential new communications and guarding against unwanted communications to be automatically adjusted. A message sequence chart of one or more processes for controlling communications at a recipient device is provided in FIG. 19, which provides a broad overview of the example equipment, device, and software changes to various systems in the infrastructure.

Figure 1:
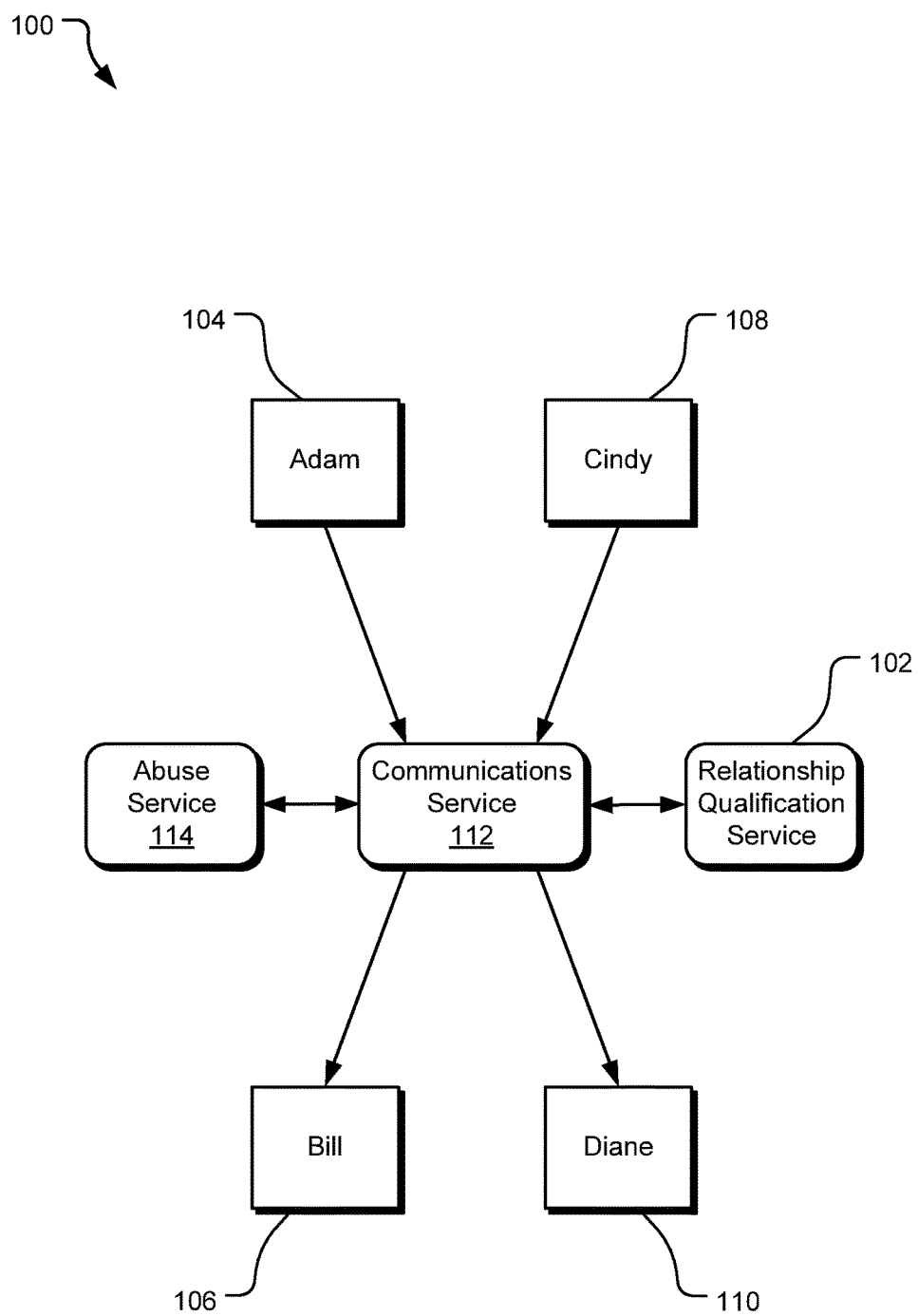
FIG. 1 illustrates example entities in a communication system including a relationship qualification service.

FIG. 1 illustrates example entities in a communication system 100 including a relationship qualification service 102. Four users 104 (Adam), 106 (Bill), 108 (Cindy), and 110 (Diane) communicate via a communications service 112, such as by sending email messages, sending text or instant messages, making telephony or video calls, leaving audio and/or video messages, etc. Each user has one or more computing devices though which they can receive communications (e.g., a mobile phone, a tablet computer, a game console, a laptop computer, etc.)

Within such a system 100, many communication scenarios are contemplated. For example, assume Adam attempts to send an instant message to Bill. If a sufficient relationship exists between Adam and Bill, the communications service 112 may forward the message to Bill without constraints because it may be assumed that Bill would be willing to receive a message from his friend Adam and to even be interrupted via the user interface on Bill's computing device. In contrast, if Bill does not have a sufficient relationship with Adam (e.g., Adam is a stranger to Bill), then the communications service 112 may still send the message to Bill but with certain constraints to protect Bill from unwanted interruptions or from unwanted message content (e.g., spam advertisements). In the illustrated implementation, the communications service 112, which can execute on one or more servers, manages the delivery of such messages to Bill based on a determined relationship type. The relationship qualification service 102, which can execute on one or more servers, determines the relationship type between Adam and Bill based on a variety of relevant information, including without limitations, known contacts of Bill, any previous communication history between Adam and Bill (particularly where Bill has responded to Adam, shared contacts, membership in the same enterprise network, etc.). It should be understood that the communications service 112 and the relationship qualification service 102 may be fully or partially integrated (e.g., executing on one or more common servers, being operated by the same service provider) or separate (e.g., executing on completely different servers, being operated by different service providers, etc.).

In some implementations of the system 100, message recipients may be protected by a first line of defense in the form of an abuse service 114, which monitors messages received by the communications service 112 and detects communications abuses (e.g., spam, messages from known malware sources, messages from known phishing sources, etc.). For example, the abuse service 114 may identify the abusive messages to the communications server 112, which can follow predefined security policies regarding such messages (e.g., blocking the messages, quarantining the messages, etc.) The relationship qualification service 102, in contrast, provides a second line of defense against unwanted interruptions or message content, in this case based upon discernable relationships between the sender and the recipient.

The relationship qualification service 102 determines a relationship type between the sender and the intended recipient and provides information to allow the communications service 112 to determine how a message is sent from Adam to Bill. For example, if the relationship qualification service 102 collects relevant evidence to satisfy a predefined relationship condition between Bill and Adam to indicate that Adam and Bill have an sufficient relationship to forward the message from the communications service 112 to Bill, then the relationship qualification service 102 can pass the determined relationship type (or some other relevant indication) to the communications service 112, and the communications service 112 can decide whether and under what conditions to send the message to Bill.

In one implementation, the relationship qualification service 102 determines that Adam and Bill have a particular relationship type, so the communications service 112 annotates (e.g., tags) the message to indicate the relationship type, or alternatively, to indicate any constraints in the message presentation to Bill. For example, if the relationship qualification service 102 determines that Adam and Bill are "friends" (indicative of there being a high probability that Bill would want to communicate with Adam), then the communications service 112 can annotate the message in a manner that causes Bill's device to provide an interrupting and revealing delivery through its user interface (e.g., an audio alert, a vibration, a visual notification of the message delivery and its contents, etc.). This annotation may simply indicate that the message is to be delivered without constraints. In contrast, if the relationship qualification service 102 determines that Adam and Bill are "strangers" (indicative of there being a low or unknown probability that Bill would want to communicate with Adam), then the communications service 112 can annotate the message in a manner that causes Bill's device to provide a non-interrupting and non-revealing delivery through its user interface (e.g., no audio alert, no vibration, no visual notification or a minimal visual notification of the message delivery and its contents, etc.). For example, a message from a stranger may simply be delivered into Bill's inbox without alert at all, with only a silent increase in the unread message count, etc. In this manner, Bill is not interrupted by someone with whom he has no discernable relationship.

It should be understood that various methods of communicating presentation constraints to Bill's device may be employed. The communications service 112 may annotate the message with the relationship type, relying on Bill's device to interpret the relationship type and set the presentation constraints accordingly, possibly with contribution based on enterprise policies and/or Bill's own customized preferences. Alternatively, or in addition, the communications service 112 may annotate the message with specific presentation constraint instructions and/or the relationship type or presentation constraint instructions may be communicated in a separate message to Bill's device. In another implementation, the communications service 112 may communicate the inverse of presentation constraints, such as by indicating one or more affirmative user interface behaviors that should be applied by Bill's device upon receipt of the message (e.g., instructing an audio alert and a visual notification, implicitly omitting a vibration), possibly with contribution based on enterprise policies and/or Bill's own customized preferences. Other communication methods may be employed.

Figure 2:
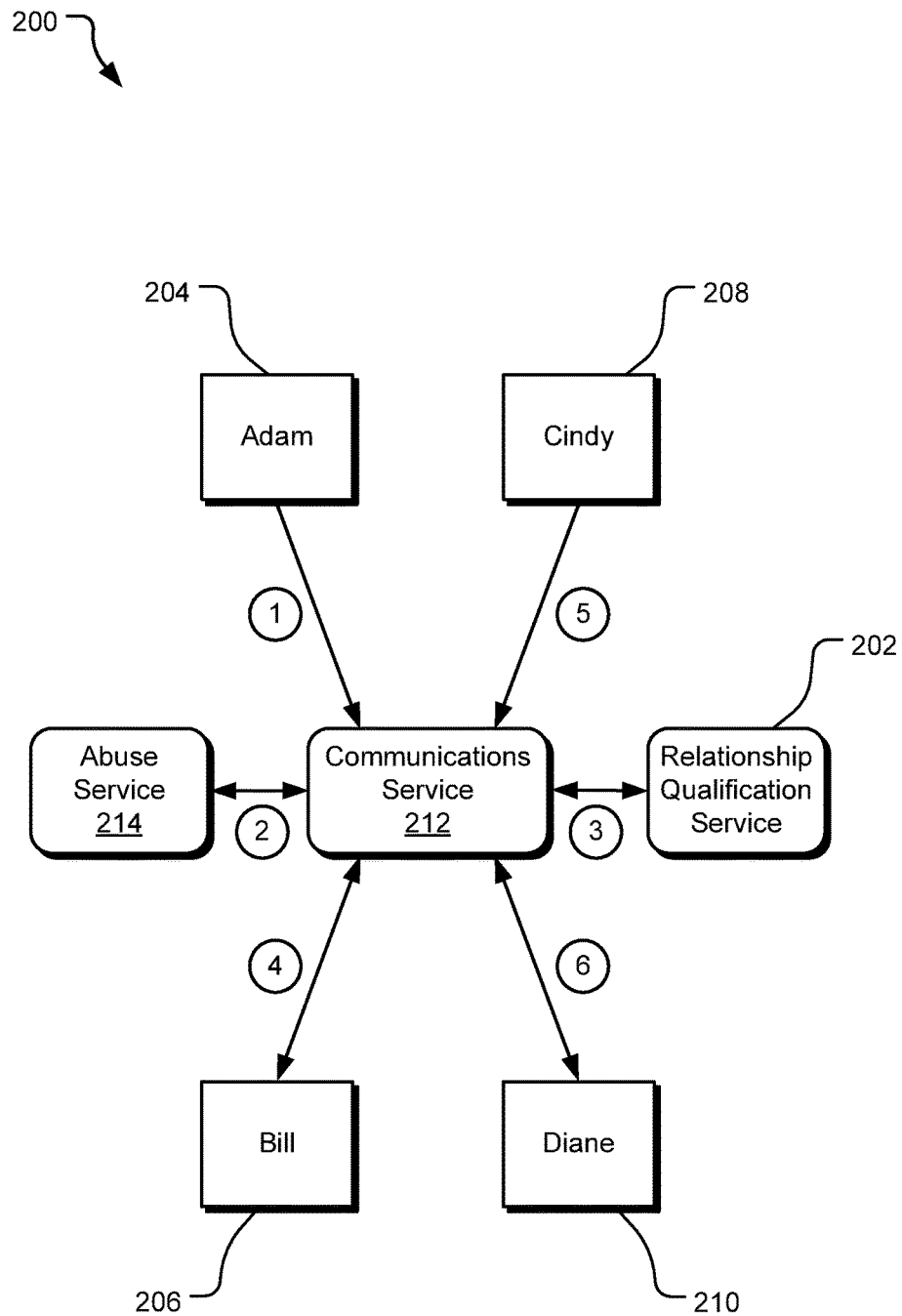
FIG. 2 illustrates example communications and entities within a communication system including a relationship qualification service.

FIG. 2 illustrates example communications and entities within a communication system 200 including a relationship qualification service 202. Four users 204 (Adam), 206 (Bill), 208 (Cindy), and 210 (Diane) communicate via a communications service 212, such as by sending email messages, sending text or instant messages, making telephony or video calls, leaving audio and/or video messages, etc. Each user has one or more computing devices though which they can receive communications (e.g., a mobile phone, a tablet computer, a game console, a laptop computer, etc.)

The entities in FIG. 2 interact to manage the way in which receipt of a communication from a sender is presented to a recipient based on a determined relationship type between the sender and the recipient. Differences in presentation involve different user interface behaviors presented upon receipt that may include without limitation various levels of interrupting or non-interrupting receipt of the communication, a receipt revealing various levels of message content and/or sender-related information, etc. For example, an interrupting user interface behavior may provide an audio alert (e.g., a ring), tactile alert (e.g., a vibration), and/or visual (e.g., an alert displayed on the user's screen) alert of receipt. In contrast, another interrupting receipt may omit any audio or tactile alert and only provide a visual alert if the user is active in the user interface (e.g., actively using the mobile device). An example of a non-revealing receipt may reveal only the sender's name, phone number, or email address, while the content of the communication is hidden from the recipient until and unless the recipient causes the content to be revealed (e.g., by answering the call, by instructing the recipient's device to reveal the content, etc.). The manner of interrupting/non-interrupting receipt and/or the manner of revealing/non-revealing receipt employed at the recipient's device is governed by an annotation attached to or associated with the communication sent by the communications service 212 to the recipient's device. The annotation associated with the communication forwarded by the communications service 212 is determined based on a relationship type determined between the sender and the recipient.

An example of visual alert is referred to as a "toast," where the visual alert results in a graphical display that pops up over part of a graphical user interface display at the recipient's device to alert the recipient in a simple, immediate manner of the message receipt. Some toasts remain visible for a short period of time before disappearing from view, while others may remain visible until dismissed by the user. Nevertheless, the "toast" does not overly disrupt ongoing use of the recipient's device. Toasts may be considered interrupting behaviors, in that it interrupts the user's visual experience, although different types of toasts may exhibit more interrupting than others (e.g., disappearing versus requiring dismissal).

In some cases, the relationship types are determined across a spectrum (e.g., from "stranger" to "friend" or across some other useful range. For example, a first sender may be determined to be "family," and, therefore, communications from the first sender are annotated to provide the most interrupting and/or most revealing user interface behavior (e.g., all hours available for the most interrupting and revealing user interface behavior). A second sender may be determined to be a "friend" and, therefore, communications from the second sender may be annotated to provide the most interrupting and revealing user interface behavior when the recipient has determined he or she will likely be awake. A third sender may be determined to a "coworker" and, therefore, the level of interruption may be reduced, particularly outside or work hours. A fourth sender may be determined to be a "stranger" and, therefore, communications from the fourth sender may be annotated to provide no interrupts and reveal no user content. Many other relationship types and associated delivery user interface behavior may be employed, potentially with contribution from enterprise policies and/or the recipient's own customized preferences.

In various examples described herein, communication service systems are extended and enhanced to provide a better user experience as various communications are delivered to a recipient. This approach allows a recipient's device to provide different user interface behaviors depending on a determined relationship between the sender and the recipient. In some examples, an operating system at the recipient's device (such as a mobile phone) is modified to handle the altered user interface behavior at the recipient's device (e.g., based on the annotation associated with the received communication).

An example sequence of communications and operations are shown in FIG. 2, in a communication between Adam and Bill. Adam sends a communication (e.g., a phone call, an instant message, an SMS text message, etc.) in a communication "1" (designated by the circle containing the numeral "1"). In an operation "2," the communication service 212 employs an abuse service 214 to determine whether Bill or the communication meets the conditions of a known abuse (e.g., spam, malware, etc.). For example, a communication may originate from a phone number, an email address, or an IP address that is on a blacklist maintained by the abuse service 214. In such circumstances, the communications service 212 may elect to block the communication from Adam (e.g., by not forwarding it to Bill).

If the abuse service 214 does not determine the communication to be an abuse by the abuse service 214, Bill may still want to manage its delivery based on his determined relationship with Adam (e.g., managing the level of interruption and/or content provided by the user interface). Accordingly, the communications service 212 queries the relationship qualification service 102 for a relationship type based on one or more descriptors of Bill (e.g., name, email address, phone number, IP address, instant message name, etc.) in an operation "3". The relationship qualification service 202 returns a relationship type or some other appropriate relationship indicator to the communications service 212, which annotates the communication accordingly and forwards it to Bill in a communication "4". If the relationship qualification service 202 determines that Adam and Bill are "friends," the annotation causes Bill's device to present receipt of the communication to Bill by providing one or more interrupting alerts and by revealing at least part of the communication content. Note: In some circumstances, such as a telephony call, there is no content to reveal until Bill answers the call, but in other circumstances, such as an email or text message, a portion of or the entire message may be revealed to Bill upon receipt.

It should be understood that Bill's reaction to receipt of Adam's communication may be communicated back to the communications service 212 and/or the relationship qualification service 202 to refine the relationship qualification process. For example, regardless of the initial determination of a "friend" relationship between Adam and Bill, if Bill instructs his device to block the call from Adam, the relationship qualification process may be adjusted to always block calls from Adam. Alternatively, implementation of the block on Adam may be offloaded to the communications service 212 or the abuse service 214. Likewise, if Bill continually indicates that Adam's calls are to be ignored (e.g., so that Adam can simply leave a message), then these "ignore" instructions from Bill may be communicated back to the relationship qualification service 202, which can adjust the relationship type between Adam and Bill to some different level (e.g., Adam is a friend that Bill always wants to ignore, so reduce the level of interruption or simply do not interrupt). Other adjustments to the relationship qualification process may be employed.

Another example sequence is also shown in FIG. 2, in a communication between Cindy and Diane. Cindy sends a communication (e.g., a phone call, an instant message, an SMS text message, etc.) in a communication "5". In the operation "2," the communication service 212 employs an abuse service 214 to determine whether Cindy or the communication meets the conditions of a known abuse (e.g., spam, malware, etc.). For example, a communication may originate from a phone number, an email address, or an IP address that is on a blacklist maintained by the abuse service 214. In such circumstances, the communications service 212 may elect to block the communication from the Cindy (e.g., by not forwarding it to Diane).

If the abuse service 214 does not determine the communication to be an abuse by the abuse service 214, the Diane still want to manage its delivery based on her determined relationship with Cindy (e.g., managing the level of interruption and/or content provided by the user interface). Accordingly, the communications service 212 queries the relationship qualification service 102 for a relationship type based on one or more descriptors of Cindy (e.g., name, email address, phone number, IP address, instant message name, etc.) in the operation "3". The relationship qualification service 202 returns a relationship type or some other appropriate relationship indicator to the communications service 212, which annotates the communication accordingly and forwards it to Diane in a communication "5". If the relationship qualification service 202 determines that Cindy and Diane are "strangers," the annotation causes Diane's device to present receipt of the communication to Diane by silently (e.g., no audio or tactile alert, no interrupting visual notification, only by incrementing the unread message count).

Because Diane's receipt of Cindy's communication was non-interrupting and non-revealing, Diane can find a notice of Cindy's communication in an email inbox, a message list, etc. when she opens those applications. The notice can take many forms, as discussed later, but it is likely to provide some information about Cindy so that Diane can decide whether she wants to open the email message (and reveal its contents), listen to the voice message, etc. Furthermore, Diane may decide to respond to Cindy's communication, which is substantial evidence that Diane and Cindy are not "strangers" or that Diane does not want to remain "strangers" with Cindy. Accordingly, it should be understood that Cindy's reaction to receipt of Diane's communication may be communicated back to the communications service 212 and/or the relationship qualification service 202 to refine the relationship qualification process. For example, regardless of the initial determination of a "stranger" relationship between Cindy and Diane, if Diane responds to Cindy's communication, the relationship qualification process may be adjusted to elevate the relationship between Cindy and Diane from "stranger" to some more accessible level of communications. Likewise, if Diane instructs her device to block communications from Cindy, then the "block" instructions from Diane may be communicated back to the relationship qualification service 202, which can adjust the relationship type between Cindy and Diane to some different level (e.g., "blocked stranger). Alternatively, implementation of the block between Cindy and Diane may be offloaded to the communications service 212 or the abuse service 214. Other adjustments to the relationship qualification process may be employed. Such feedback may also be provided to the abuse service 214

It should be understood that the communications service 212 may perform some or all of the functionality of the relationship qualification service 202 (e.g., in that they are integrated or highly cooperative services). For example, the communications service 212 may cache feedback from the recipient, certain source context information, determined relationship types, and use this cached data rather than interacting directly with the relationship qualifications service 202 with each communication. In particular, this approach is efficient in the context of a recipient-authorized communication (e.g., the recipient responded to the source's communication and therefore the communications service 212 can pass communications between the source and the recipient without querying the relationship qualification service 202). Furthermore, the abuse service 214 may also perform some or all of the functionality of the relationship qualification service 202.

Figure 3:
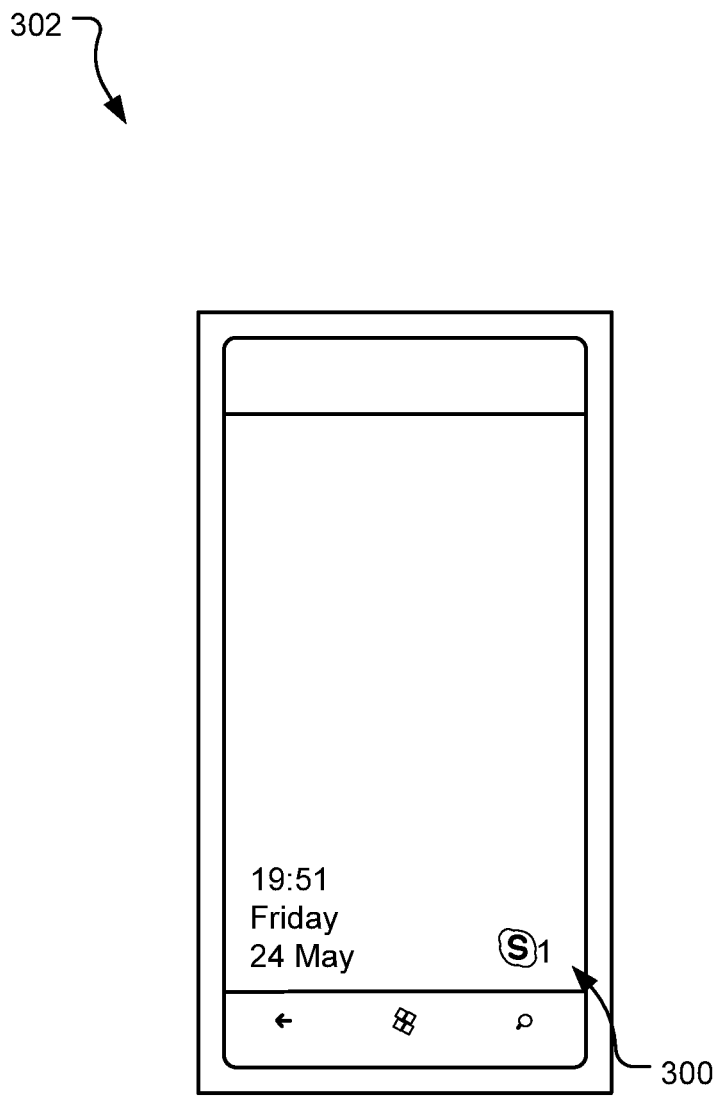
FIG. 3 illustrates an example non-interrupting, non-content-revealing indication of receipt of a "stranger" relationship type communication.

FIG. 3 illustrates an example non-interrupting, non-content-revealing indication 300 of receipt of a "stranger" relationship type communication. The mobile device 302 represents a recipient's device in a passive mode (e.g., in the lock screen as opposed to an active mode in which the recipient is actively using an application on the device 302). In the scenario of receipt of a communication from a "stranger," the device 302 does not interrupt the recipient with a vibration, a ring, etc. Instead, the receipt is presented through the user interface by incrementing (or in this case, displaying) the count of unread messages. In contrast, in the scenario of receipt of a communication from a "friend," the device 302 would likely interrupt the recipient with a vibration, a ring, etc. and could reveal a portion of a message. It should be understood that similar behavior may be exhibited on a tablet computer, a laptop, a desktop computer, a wearable computing device, a gaming console, etc.

Figure 4:
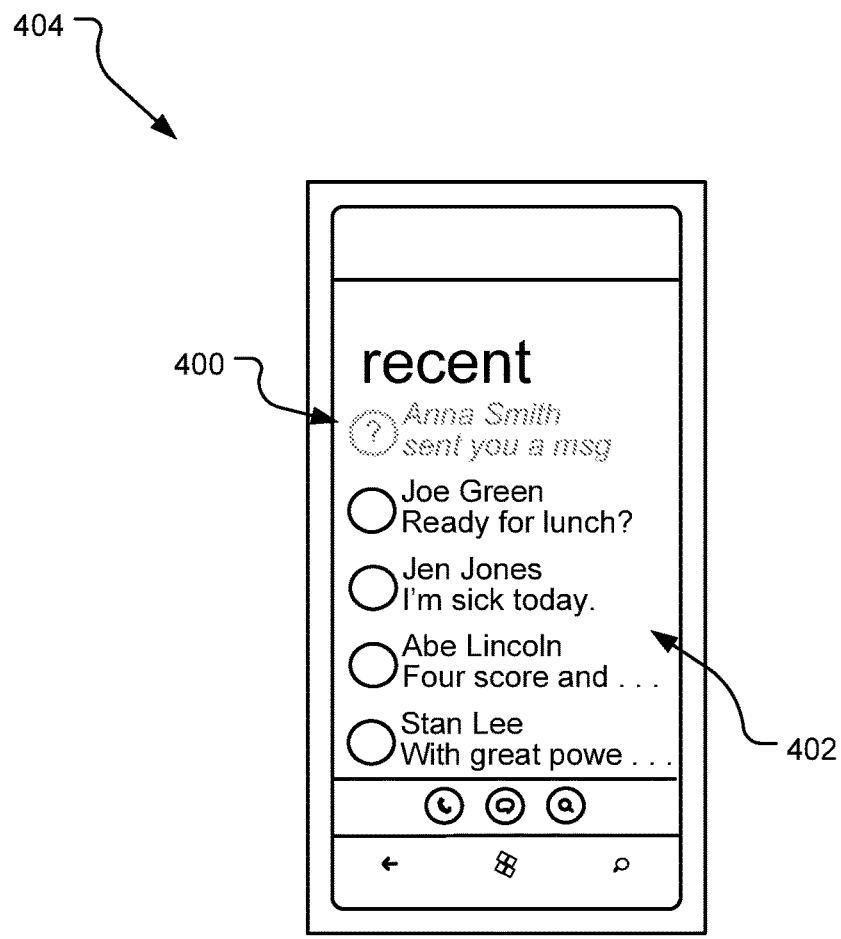
FIG. 4 illustrates an example non-content-revealing indication of receipt of a "stranger" relationship type message is a recent message listing.

FIG. 4 illustrates an example non-content-revealing indication 400 of receipt of a "stranger" relationship type message is a recent message listing 402. The mobile device 302 represents a recipient's device executing a messaging application. A person named "Anna Smith" has attempted to send a message to the recipient, as indicated by indication 400. However, the communications service and relationship qualification service has determined that available evidence indicates that the Anna Smith is a "stranger" to the recipient, and therefore, in this screen, hides message content from the recipient. One justification for this non-revealing presentation is the concept that a "spammer" is successful if a recipient sees the content of a spam message. Accordingly, by hiding the message content sent by a "stranger," the communications service has thwarted the spammer to some extent.

The appearance of the indication 400, which differs from the other messages sent by friends, provides the recipient with notice that the associated message is from a sender that has been deemed a "stranger" or at least some sender subject to a non-revealing constraint. The indication 400 provides limited information (e.g., the name "Anna Smith") to give the recipient some indication of the message source, allowing the recipient to decide whether to investigate the message further. To do so, the recipient can select the message (e.g., by touching the message via a touch screen) to access more information about the sender and to manage whether to show the message or block messages from the sender. The recipient may also delete (with or without seeing the message content) through a sequence of user interface actions.

It should be understood that, with the spectrum of relationship types, a spectrum of presentation constraints may also be applied. For example, the relationship type determined in FIG. 4 presents the message indication with significant constraints, showing only the sender's name. In contract, a relationship type that shows a greater level of anticipated relationship may show a more information in the indication 400, such as showing a picture of the source, etc. The correspondence between the level of constraints and the relationship types may be configured based on hard-coded rules, enterprise policies, user settings, etc.

In addition, the example relationship types discussed herein are merely examples intended to show a level of perceived relationship or trust the recipient or the relationship qualification service attached to the communication or the source of the communication. In one implementation, communication with a "friend" relationship type may be considered a "highly trusted" communication, while communication with a "stranger" relationship type may be considered a "poorly trusted" communication, with an appropriate level of presentation constraint.

Figure 5:
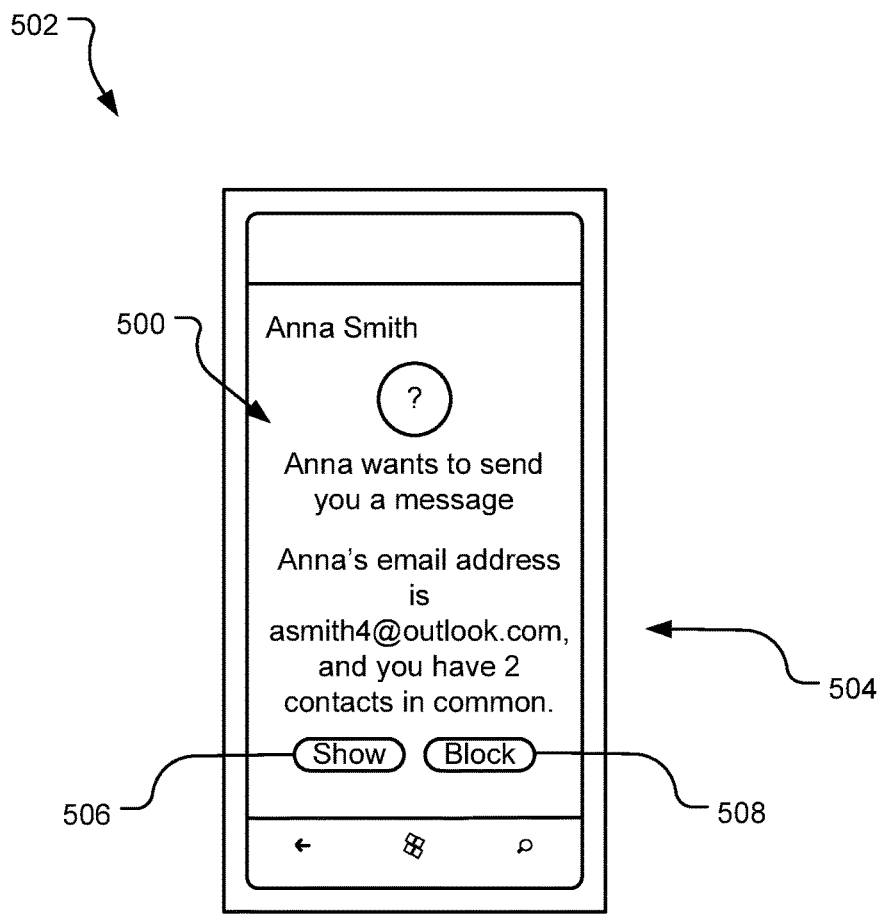
FIG. 5 illustrates an example prompt relating to receipt of a "stranger" relationship type message.

FIG. 5 illustrates an example prompt 500 relating to receipt of a "stranger" relationship type message. If the recipient selects the message from FIG. 4, then the mobile device 502 presents the prompt 500, providing additional information 504 about the sender and/or the recipient's perceived relationship with the sender (collectively referred to as source context information). In this case the source context information 504 reveals the sender's email address and the number of contacts the sender and recipient have in common. The source context information may be associated with the message (e.g., by being attached to the message as part of an annotation, being sent in a separate communication responsive to the recipient's selection of the message, etc.).

The recipient may select a "Show" control 506 to show the message content. In some implementations, the decision to show the message may be communicated back to the communications service and/or relationship qualification service to provide more information about the recipient's relationship with the sender. Selection of the "Show" control presents the message content to the recipient.

The recipient may select a "Block" control 508 to block future messages from Anna Smith. In some implementations, the decision to block messages from Anna Smith may be communicated back to the communications service, the relationship qualification service, or the abuse service to implement future blocks. Alternatively, implementation of the blocking may occur locally. In some implementations, blocking the message may also delete the message from the message list of FIG. 4.

Figure 6:
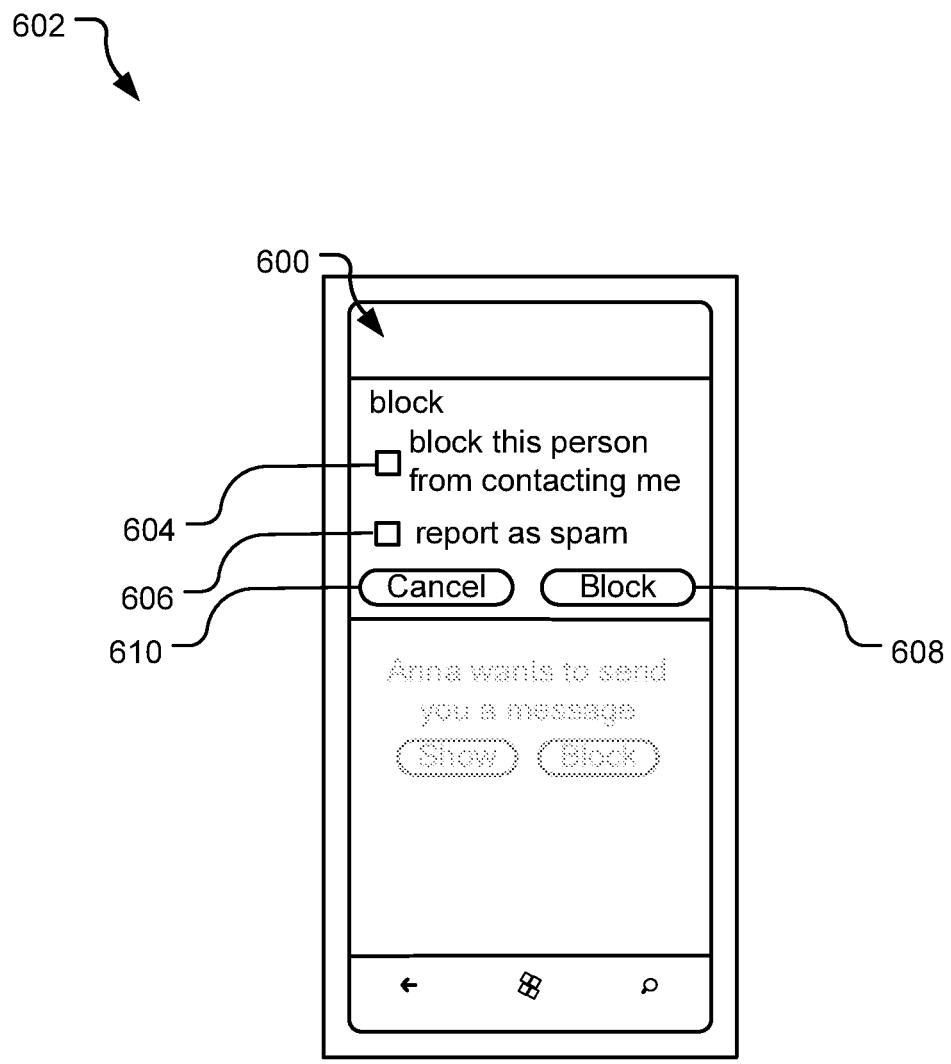
FIG. 6 illustrates an example blocking action prompt relating to receipt of a "stranger" relationship type message.

FIG. 6 illustrates an example blocking action prompt 600 relating to receipt of a "stranger" relationship type message. In the implementation of FIG. 6, selection of the "Block" control 508 of FIG. 5 invokes the prompt 600 to allow the recipient some finer control over the blocking operation. The mobile device 602 presents the prompt 600 and offers selection of two options associated with the blocking operation. The option 604, if checked when the recipient selects the "Block" control 608, allows the recipient block all communications (e.g., messages, phone calls, etc.) from the sender. Note: Selecting the "Block" control 608 without selecting the option 604 limits the block to the type of communication received (e.g., messaging in this case). The option 606, if check when the recipient selects the "Block" control 608, allows the recipient report the message as spam. Feedback from both options may be communicated back to the communications service, the relationship qualification service, and/or the abuse service. The "Cancel" control 610 takes the recipient back to the prompt 500 of FIG. 5, without executing a block command. In other implementations, another option (not shown) may be presented to allow a recipient to report that the source's account may have been hacked. In yet another implementation, an option (not shown) may be presented to stop interrupting alerts from a source without blocking communications entirely. Such actions may be reported back to the communications service, relationship qualification service, and/or abuse service.

Figure 7:
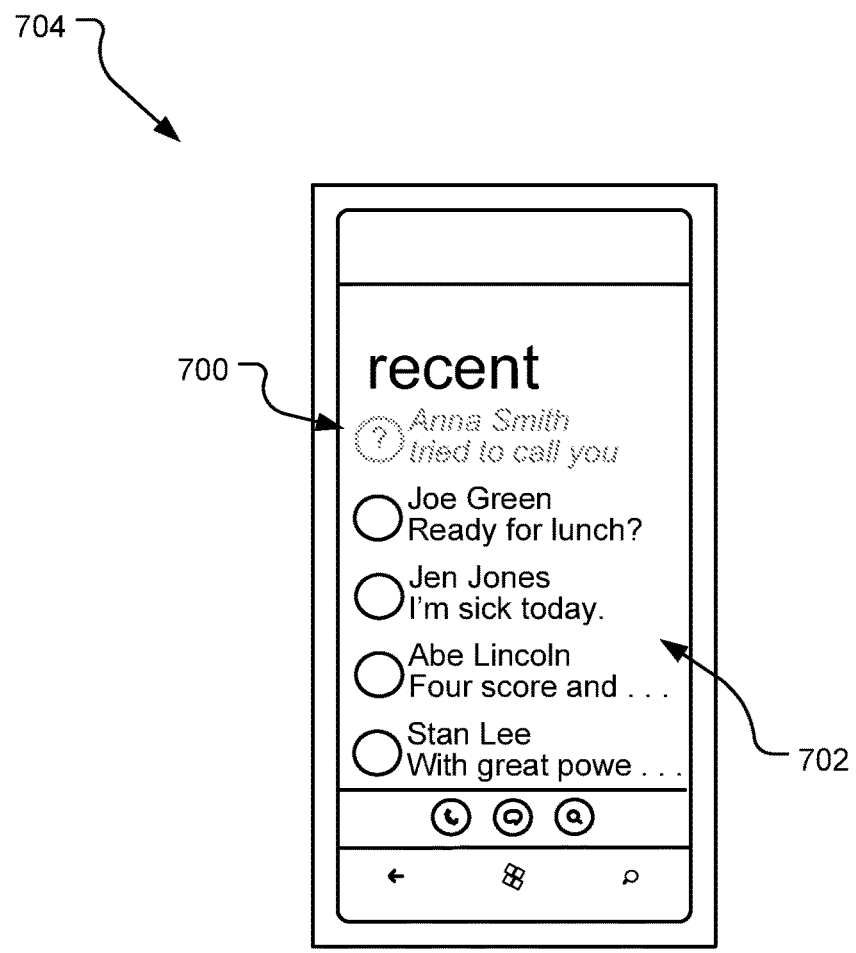
FIG. 7 illustrates an example non-content-revealing indication of receipt of a "stranger" relationship type call is a recent calls listing.

FIG. 7 illustrates an example non-content-revealing indication 700 of receipt of a "stranger" relationship type call is a recent calls listing 702. The mobile device 704 represents a recipient's device executing a telephony application. A person named "Anna Smith" has attempted to call the recipient, as indicated by indication 700. However, the communications service and relationship qualification service has determined that available evidence indicates that the Anna Smith is a "stranger" to the recipient, and therefore, the recipient was not interrupted with an alert or notification of the receipt. Instead, the call is not answered and/or is sent to voice mail. When the recipient opens the telephony application on the mobile device 704, the message and the sender of the messages are displayed in the recent calls list 702.

The appearance of the indication 700, which differs from the other recent call sent by friends, provides the recipient with notice that the associated call was from a caller (e.g., a sender) that has been deemed a "stranger" or at least some caller that is subject to a non-interrupting constraint. The indication 700 provides limited information (e.g., the name "Anna Smith") to give the recipient some indication of the call source, allowing the recipient to decide whether to investigate the call further. To do so, the recipient can select the call entry (e.g., by touching the call entry via a touch screen) to access more information about the caller and to manage whether to present a voice or video message from the caller or block calls from the caller. The recipient may also delete (with or without accessing any voice or video message) through a sequence of user interface actions.

Figure 8:
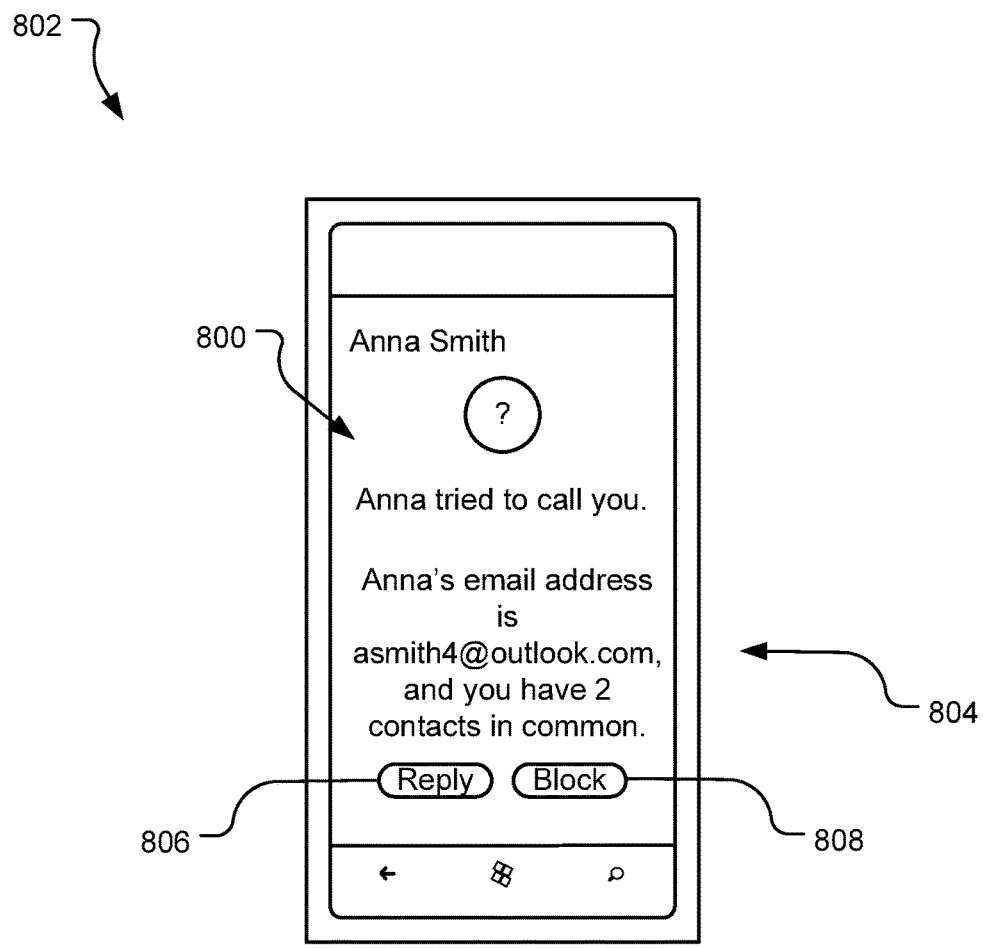
FIG. 8 illustrates an example prompt relating to receipt of a "stranger" relationship type call.

FIG. 8 illustrates an example prompt 800 relating to receipt of a "stranger" relationship type call. If the recipient selects the call entry from FIG. 7, then the mobile device 802 presents the prompt 800, providing additional information 804 about the caller and/or the recipient's perceived relationship with the caller (collectively referred to as source context information). In this case the source context information 804 reveals the caller's email address and the number of contacts the caller and recipient have in common. The source context information may be associated with the call (e.g., by being attached to a portion of the call as part of an annotation, being sent in a separate communication responsive to the recipient's selection of the call entry, etc.).

The recipient may select a "Reply" control 806 to reply to the call. In some implementations, the decision to reply to the call may be communicated back to the communications service and/or relationship qualification service to provide more information about the recipient's relationship with the caller. Selection of the "reply" control initiates a call to the original caller from the mobile device 802.

The recipient may select a "Block" control 808 to block future calls from Anna Smith. In some implementations, the decision to block calls from Anna Smith may be communicated back to the communications service, the relationship qualification service, or the abuse service to implement future blocks. Alternatively, implementation of the blocking may occur locally. In some implementations, blocking the calls may also delete the call entry from the recent calls list of FIG. 7.

Figure 9:
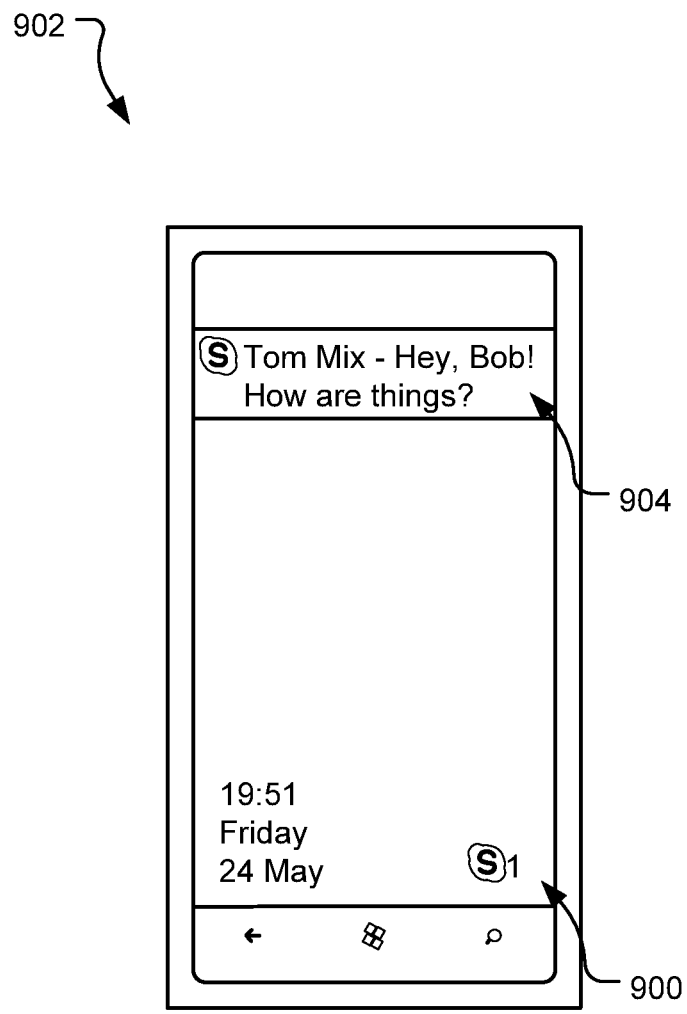
FIG. 9 illustrates an example indication of receipt of a "friend" relationship type message.

FIG. 9 illustrates an example indication 900 of receipt of a "friend" relationship type message. The mobile device 902 represents a recipient's device in a passive mode (e.g., in the lock screen as opposed to an active mode in which the recipient is actively using an application on the device 902). In the scenario of receipt of a communication from a "friend," the device 902 can interrupt the recipient with a vibration, a ring, etc., present the indication 900 through the user interface by incrementing (or in this case, displaying) the count of unread messages, and further reveal some portion of message content in the banner notification 904. It should be understood that similar behavior may be exhibited on a tablet computer, a laptop, a desktop computer, a wearable computing device, a gaming console, etc.

Figure 10:
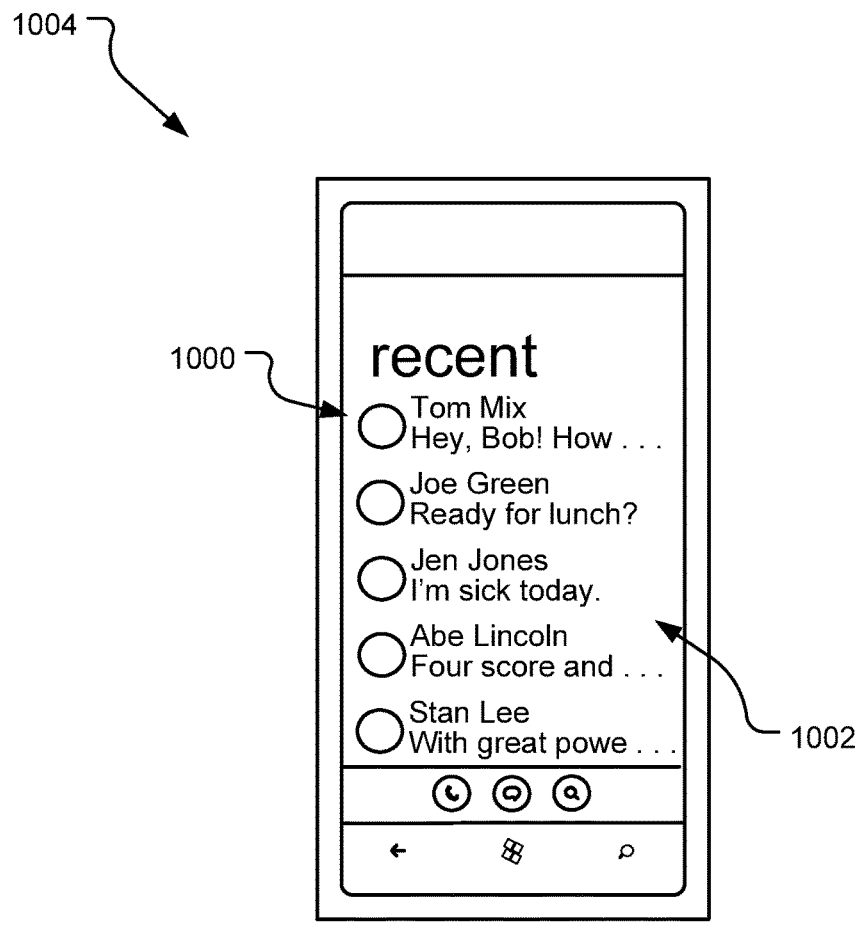
FIG. 10 illustrates an example indication of receipt of a "friend" relationship type message is a recent message listing.

FIG. 10 illustrates an example indication 1000 of receipt of a "friend" relationship type message is a recent message listing 1002. The mobile device 1004 represents a recipient's device executing a messaging application. A person named "Tom Mix" has attempted to send a message to the recipient, as indicated by indication 1000. Furthermore, the communications service and relationship qualification service has determined that available evidence indicates that the Tom Mix is a "friend" to the recipient, and therefore, in this screen, reveals message content from the recipient. It should be understood that the relationship qualification service's determination of the "friend" relationship type between Tom Mix and the recipient may be incorrect. Accordingly, in one implementation, however, the message application may present a "Block" control (not shown) in the screen of FIG. 10 to allow the recipient to easily block future messages from Tom Mix.

Figure 11:
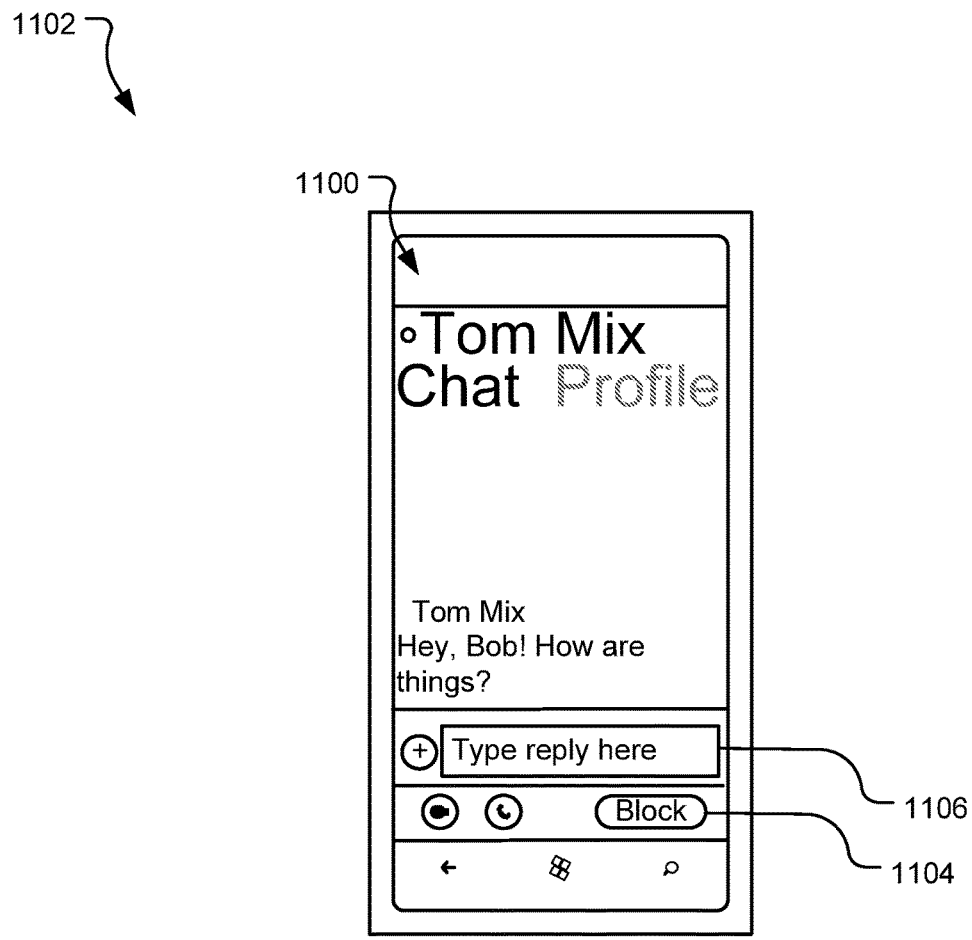
FIG. 11 illustrates an example messaging screen for a sender having "friend" relationship type with the recipient.

FIG. 11 illustrates an example messaging screen 1100 for a sender having "friend" relationship type with the recipient. If the recipient selects the message from FIG. 10, then the mobile device 1102 presents the messaging screen 1100 to allow the recipient to respond to the message via input box 1106. If the recipient responds to the message, the action of responding may be communicated back to the communications service and/or the relationship qualification service to further refine the relationship qualification process.

The messaging screen 1100 also presents a "Block" control 1104 to allow the recipient to block communications with Tom Mix (e.g., if the recipient discovers that the sender is not the friend he thought the sender was). The recipient may select a "Block" control 1104 to block future messages from Tom Mix. In some implementations, the decision to block messages from Tom Mix may be communicated back to the communications service, the relationship qualification service, or the abuse service to implement future blocks. Alternatively, implementation of the blocking may occur locally. In some implementations, blocking the message may also delete the message from the message list of FIG. 10.

Note: In some implementations, communications from a source with a high-level relationship type may or may not include such a prominent blocking control 1104. Instead, given a high enough level of trust, the recipient's device may bury the blocking control 1104 a little deeper in the user interface (e.g., in a drop down menu). This example shows yet another type of presentation constraint corresponding to a relationship type within the spectrum of relationship types (e.g., or levels of trust).

Figure 12:
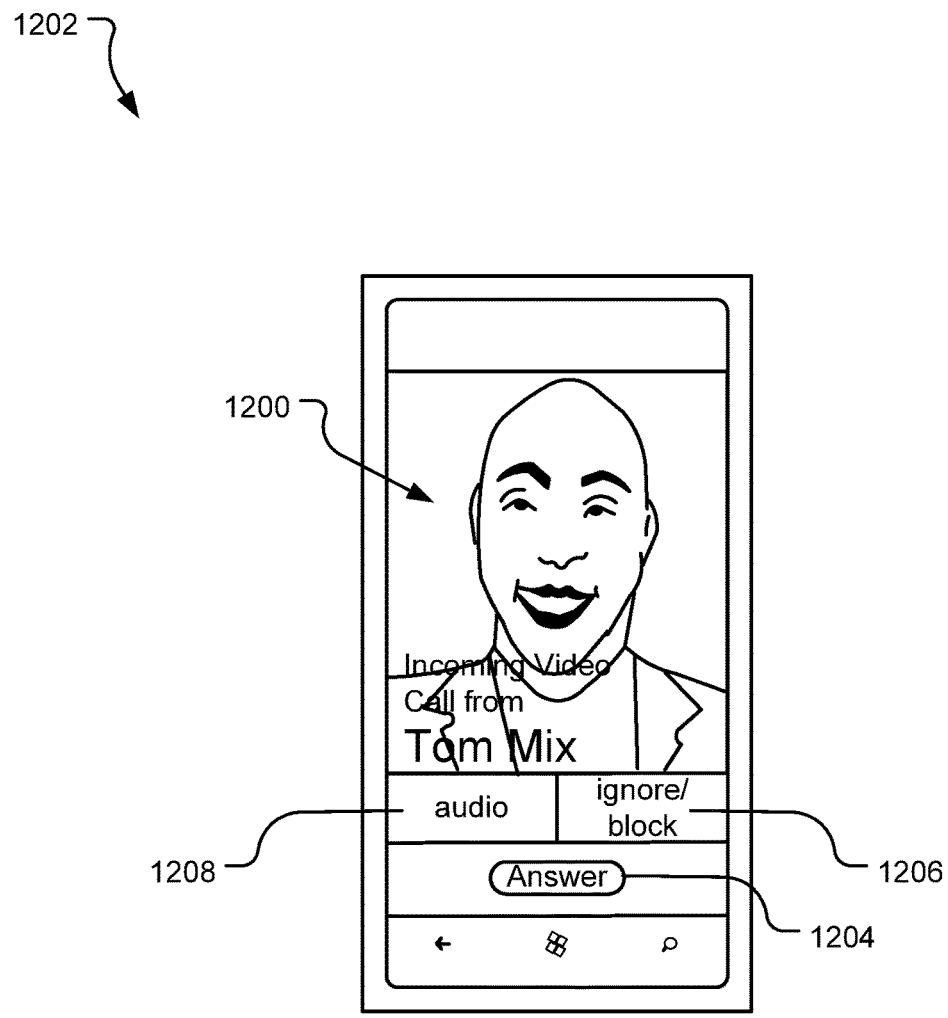
FIG. 12 illustrates an example indication of receipt of a "friend" relationship type video call.

FIG. 12 illustrates an example indication 1200 of receipt of a "friend" relationship type video call. The mobile device 1202 presents an available picture of the caller's based on the phone number, communications tag, etc. as part of the indication 1200. In the scenario of receipt of a call from a "friend," the device 1202 can interrupt the recipient with a vibration, a ring, etc., present the indication 1200 through the user interface to alert the recipient of the incoming call. It should be understood that similar behavior may be exhibited on a tablet computer, a laptop, a desktop computer, a wearable computing device, a gaming console, etc.

The screen with the indication 1200 includes an "Answer" control 1204, which the recipient may select to answer the video call from Tom Mix. The screen with the indication 1200 also includes an "Ignore/Block" control 1206 to allow the recipient to manage how the call is handled. Responsive to selection of the "Ignore/Block" control 1206, the mobile device 1202 presents a prompt similar to that described with regard to FIG. 13. The screen with the indication 1200 also includes and "Audio" control 1208 to answer the incoming call with audio communications only. Note: In some implementations, communications from a source with a high-level relationship type may or may not include such a prominent "Ignore/Block" control 1206. Instead, given a high enough level of trust, the recipient's device may bury the "Ignore/Block" control 1206 a little deeper in the user interface (e.g., in a drop down menu). This example shows yet another type of presentation constraint corresponding to a relationship type within the spectrum of relationship types (e.g., or levels of trust).

Figure 13:
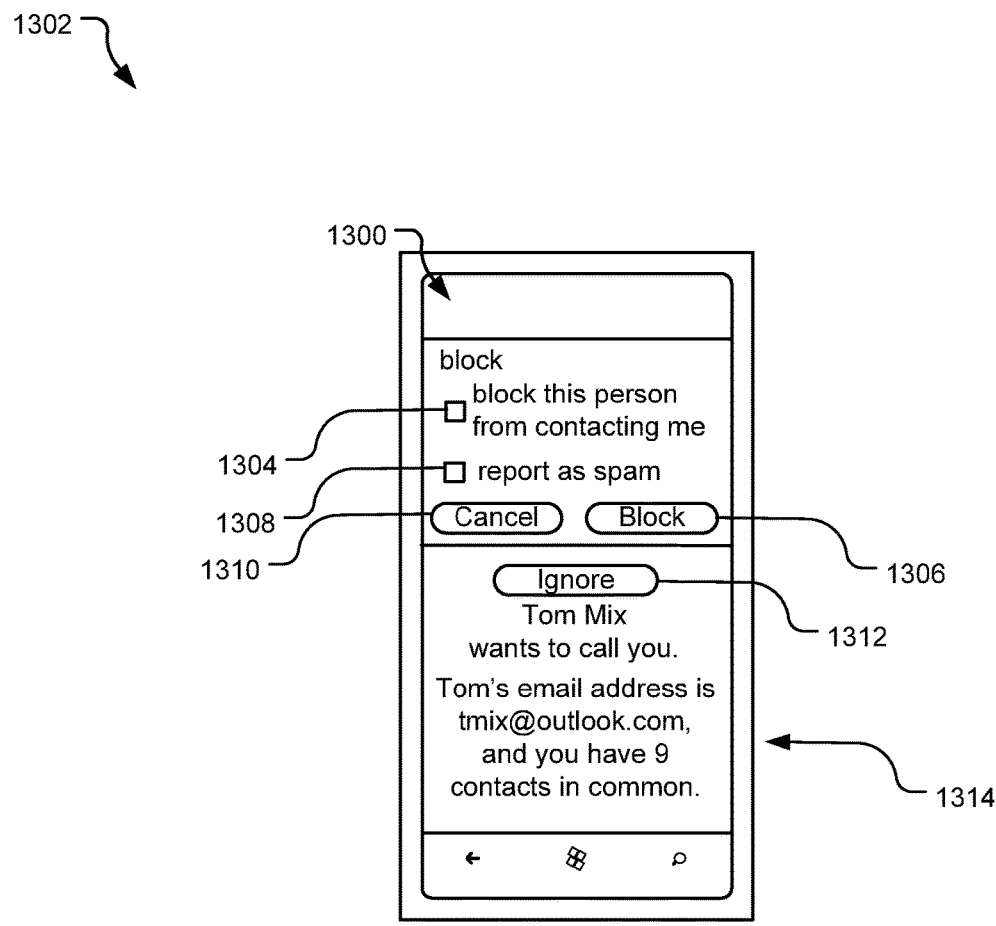
FIG. 13 illustrates an example prompt relating to alternative handling of a "friend" relationship type video call.

FIG. 13 illustrates an example prompt 1300 relating to alternative handling of a "friend" relationship type video call. In the implementation of FIG. 13, selection of the "Ignore/Block" control 1206 of FIG. 12 invokes the prompt 1300 to allow the recipient to manage alternative handling of the video call. The mobile device 1302 presents the prompt 1300 and offers selection of several options associated with the ignore/blocking operation. The option 1304, if checked when the recipient selects the "Block" control 1306, allows the recipient block all communications (e.g., messages, phone calls, etc.) from the caller. Note: Selecting the "Block" control 1306 without selecting the option 1304 limits the block to the type of communication received (e.g., messaging in this case). The option 1308, if check when the recipient selects the "Block" control 1306, allows the recipient report the call as spam. Feedback from both options may be communicated back to the communications service, the relationship qualification service, and/or the abuse service. The "Cancel" control 1310 takes the recipient back to the screen with the indication 1200 in FIG. 12, without executing a block command. The "Ignore" control 1312 stops any alerts and notifications and allows the call to ring through to a call messaging system. In other implementations, another option (not shown) may be presented to allow a recipient to report that the source's account may have been hacked. In yet another implementation, an option (not shown) may be presented to stop interrupting alerts from a source without blocking communications entirely. Such actions may be reported back to the communications service or relationship qualification service.

In the implementation illustrated in FIG. 13, the mobile device 1302 also presents additional information 1314 about the caller and/or the recipient's perceived relationship with the caller (collectively referred to as source context information). In this case the source context information 1314 reveals the caller's email address and the number of contacts the caller and recipient have in common. The source context information may be associated with the call (e.g., by being attached to the call as part of an annotation, being sent in a separate communication responsive to the recipient's selection of the call, etc.). Such information can be useful in helping the recipient decide whether to answer, block, or ignore the call.

Figure 14:
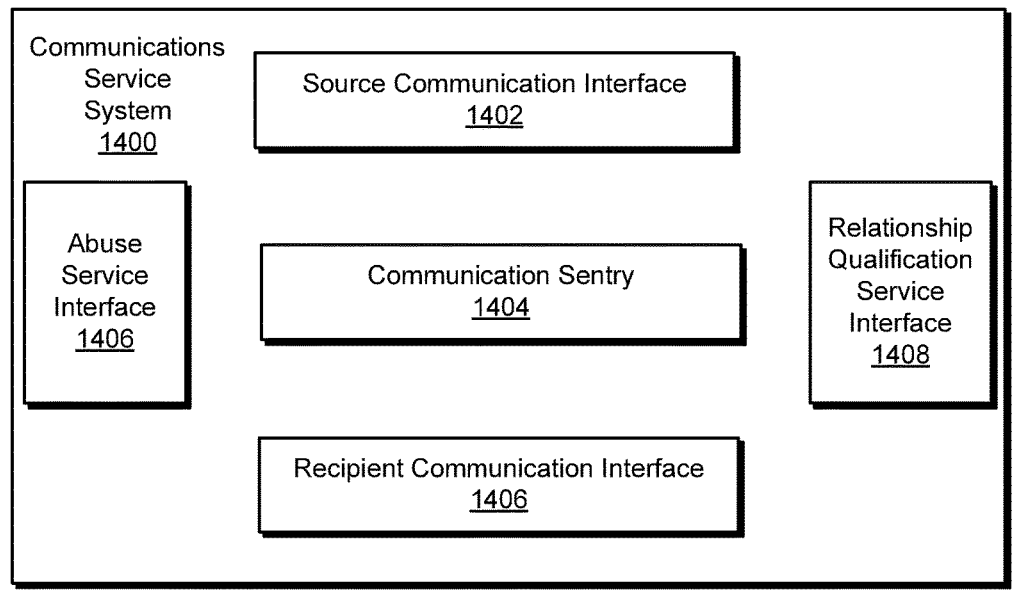
FIG. 14 illustrates an example communications service system.

FIG. 14 illustrates an example communications service system 1400. A source communication interface 1402 receives communications from a source (e.g., a sender, a caller, etc.) and sends them to a communications sentry 1404, which manages the handling of the communications. The source communication interface 1402 may also send recipient communications back to the source, when and if the recipient decides to respond to the source's communication.

The communications sentry 1404 receives a communication from the source communication interface 1402 and queries an abuse service via an abuse service interface 1406. If the abuse service identifies the source or the communication as an abusive communication, the communications sentry 1404 can block communications from the source to the intended recipient.

The communications sentry 1404, whether independent of the abuse service query or responsive to passing the abuse service query, queries a relationship qualification service via a relationship qualification service interface 1408. The relationship qualification service returns to the communications sentry 1404 a relationship type and potentially source context information based on available information (e.g., contacts of both sender and intended recipient, enterprise information, communication history, etc.). The communications sentry 1404 annotates the communication based on the relationship type (e.g., to provide presentation constraints, to provide presentation instructions, to provide source context information, etc.) and forward the communication and the annotation to the intended recipient via the recipient communication interface 1406. The recipient communication interface 1406 may also receive recipient communications and pass these communications to the communications sentry 1404, when and if the recipient decides to respond to the source's communication.

The recipient communication interface 1406 may also receive feedback from the recipient indicating the recipient's handling of the communication from the source. For example, if the recipient replies to the source, the communications sentry 1404 may forward an indication of such action to the relationship qualification service to refine the relationship qualification process. Likewise, if the recipient ignores a call repeatedly, such information may be communicated through the communications sentry 1404 to the relationship qualification service 1406 to further refine the relationship qualification process. Other such refinements are possible based on received behavior feedback received from the intended recipient via the recipient communication interface 1406.

Figure 15:
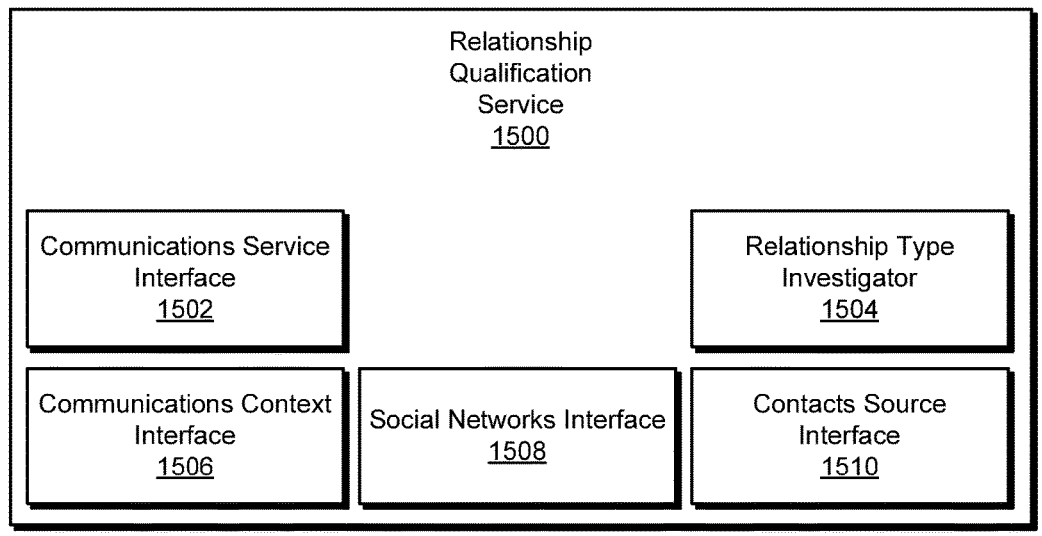
FIG. 15 illustrates an example relationship qualification service system.

FIG. 15 illustrates an example relationship qualification service system 1500. The relationship qualification service system 1500 receives queries from a communications service system and returns a relationship type, both via a communications service interface 1502 in the illustrated implementation. The query may include various source and recipient identifiers, including a name, email address, instant messaging name, phone number, etc. Based on such identifiers, a relationship type investigator 1504 collects information regarding one or both of the source and the recipient to determine a relationship type between the two.

As previously discussed, the available relationship types may span a spectrum (e.g., from "stranger" to "family member"), with two or more relationship types within the spectrum. Different levels of relationship type may correspond to different levels of interrupts and/or content revealing at the recipient's device.

The relationship type investigator 1504 collects a variety of information and classifies the relationship between the source and the recipient into one of the relationship types. For example, communication history, a source's send-receive rations, a source's block count, etc. can be received via a communications context interface 1506. Social network relationship and common friends/connections within a social network can be received via a social media interface 1508. Address book information, phone number information, etc. can be received through an address book interface 1510. Other interfaces may be employed to gather other relevant relationship information. Some of the collected relationship information may also be communicated to the communications service and on to the recipient (e.g., the number of common contacts, the source's email address, etc.)

The list below describes some example rules considered by an relationship type investigator:

Address Book Match—Does the source identifier match an entry in the recipient's address book(s)?

Phone Number Validation—(a) Does source have a verified phone number and (b) does source have recipient's phone number in source's address book?

Communication History—Is there evidence that recipient has ever communicated (e.g., emailed, called, instant messaged, texted, etc.) the source?

Sharing—Are source and recipient sharing documents within a document sharing system?

Public Access—Has recipient indicated that he/she wants the public to have unconstrained deliver access to his/her device?

Physical Network—Are source and recipient on the same physical wired network?

Social Network—Are source and recipient already connected or "friends" in a social network?

Work Domain—Are source and recipient within the same work (e.g., private) domain?

Shared Contacts—How many common contacts to the source and recipient have between them?

Send-receive Ratios—Does the source have a high ratio of sent communications compared to received communications with other recipients?

Many Blocks—Does the source have a high number of recipients already blocked the source?

Other relationship rules may apply.

In one implementation, the rules may be evaluated with different weights applied to each rule, based on heuristic, algorithmic, or numerically-determined models, to determine whether the collected information satisfies a particular relationship condition. In other implementations, predetermined assortments of rules must be satisfied to meet a particular relationship condition (e.g., a recent communication from the recipient to the source may by itself satisfy a "friend" type by itself, whereas following someone in a microblogging service requires the source to pass other rules, such as a low send-receive ratio and not being blocked by many recipients). In alternative implementations, initial weights may be associated with individual rules, and these weights can be adjusted based on the number of blocks, replies, ignores, and other relationship qualification information received by the communications service and the relationship qualification service.

Figure 16:
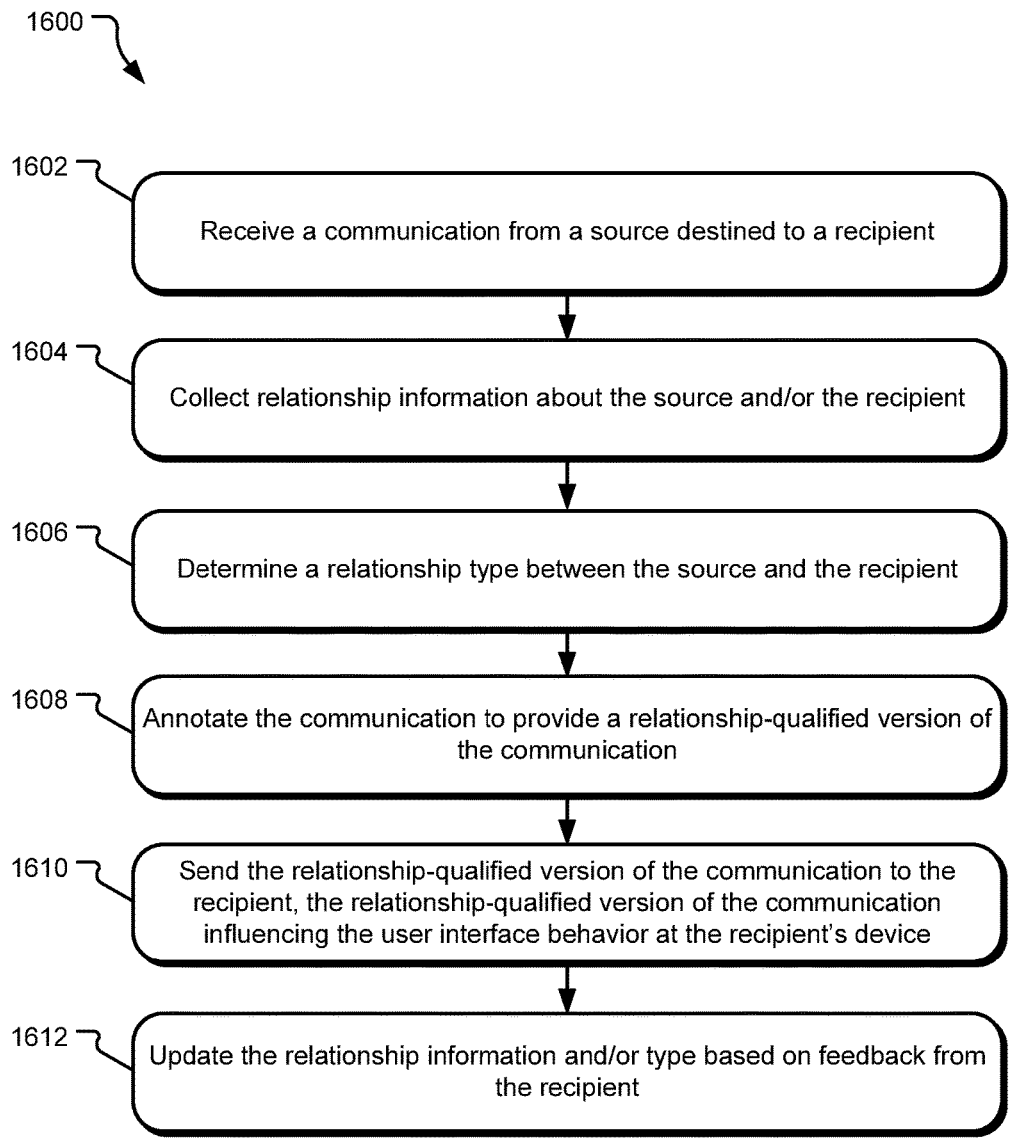
FIG. 16 illustrates example operations for providing relationship-based communications.

FIG. 16 illustrates example operations 1600 for providing relationship-based communications. A receiving operation 1602 receives a communication from a source (e.g., a message sender, a caller, etc.) to a recipient with a computing device on which the recipient can receive the communication. A collection operation 1604 collects relationship information about the source and/or the recipient. A determining operation 1606 determines a relationship type between the source and the recipient based on at least some of the collected relationship data.

An annotation operation 1608 annotates the communication to affect how receipt of the communication by the recipient's device will be presented to the recipient through its user interface. The annotation may include without limitation a relationship type, presentation constraints or instructions, source context information, etc. The annotated communication is referred to a "relationship-qualified version of the communication" because it has been annotated based on the relationship type determined between the source and the recipient. A sending operation 1610 forwards the relationship-qualified version of the communication to the recipient, where the annotation causes certain user interface behavior to be presented to the recipient through the recipient's device.

An updating operation 1612 updates the relationship information available to a relationship qualification service based on feedback from the recipient's management of the received communication. For example, if the recipient replies to the communication, then the communication history is updated. If the recipient blocks communications from the source, then the block count is updated. Other such updates may be employed based on the recipient's management of the communication.

Figure 17:
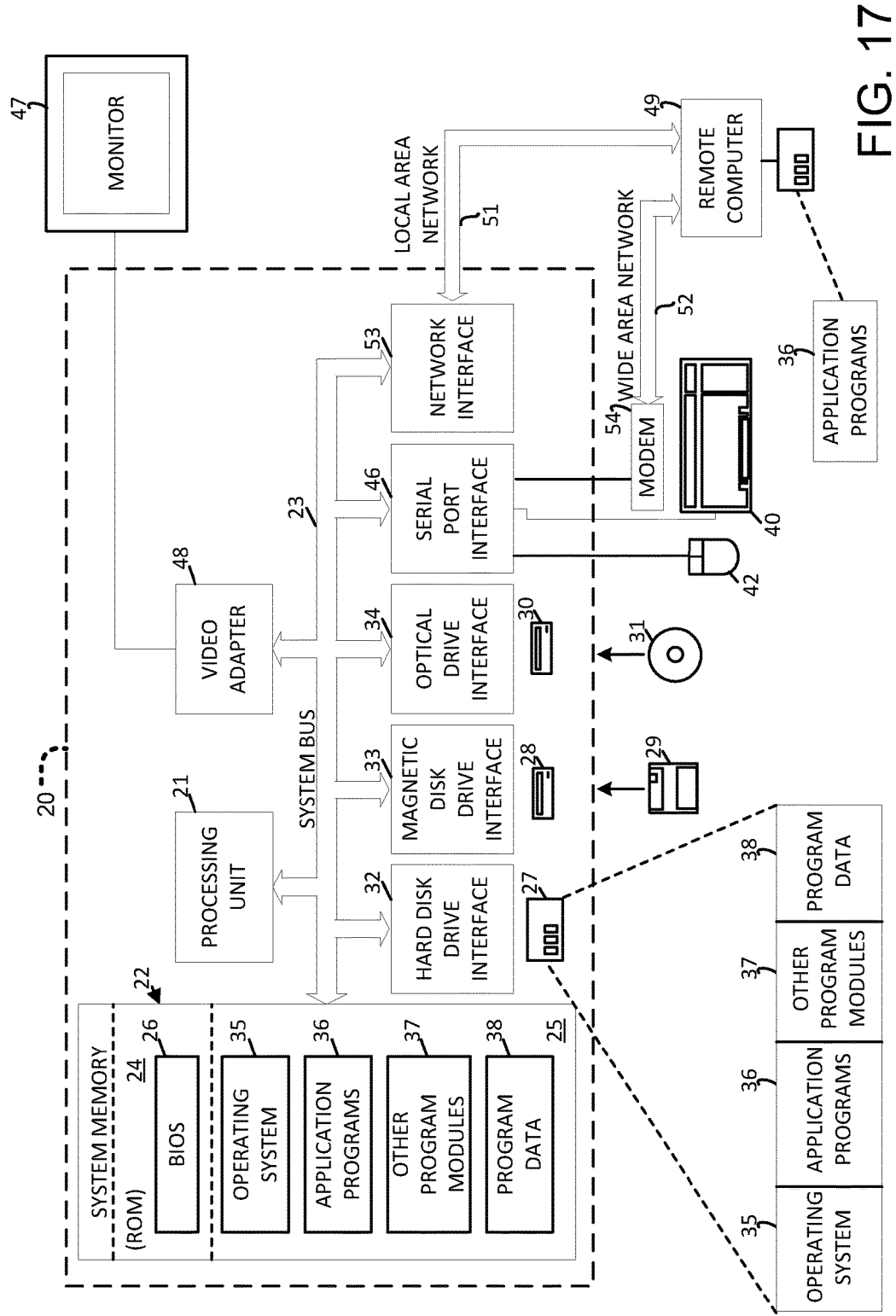
FIG. 17 illustrates an example system that may be useful in implementing the described technology.

FIG. 17 illustrates an example system that may be useful in implementing the described technology. The example hardware and operating environment of FIG. 17 for implementing the described technology includes a computing device, such as general purpose computing device in the form of a gaming console or computer 20, a mobile telephone, a personal data assistant (PDA), a set top box, or other type of computing device. In the implementation of FIG. 9, for example, the computer 20 includes a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 17. The logical connections depicted in FIG. 17 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are example and other means of and communications devices for establishing a communications link between the computers may be used.

In an example implementation, one or more communication services, one or more application services, an abuse service, and other engines and services may be embodied by instructions stored in memory 22 and/or storage devices 29 or 31 and processed by the processing unit 21. Address books, communication histories, information about a user's social network, and other data may be stored in memory 22 and/or storage devices 29 or 31 as persistent datastores. Further, a service server represents hardware and/or software configured to provide service functionality for network-connected systems. Such services may be implemented using a general purpose computer and specialized software (such as a server executing service software), a special purpose computing system and specialized software (such as a mobile device or network appliance executing service software), or other computing configurations.

The terms "module," "program," "service," and "engine" may be used to describe an aspect of computing system 20 that is implemented to perform one or more particular functions. In some cases, such a module, program, service, or engine may be instantiated via processing unit 21 executing instructions held by system memory 22. It is to be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" are meant to encompass individual or groups of executable files, data files, libraries, drivers, scripts, database records, etc.

Figure 18:
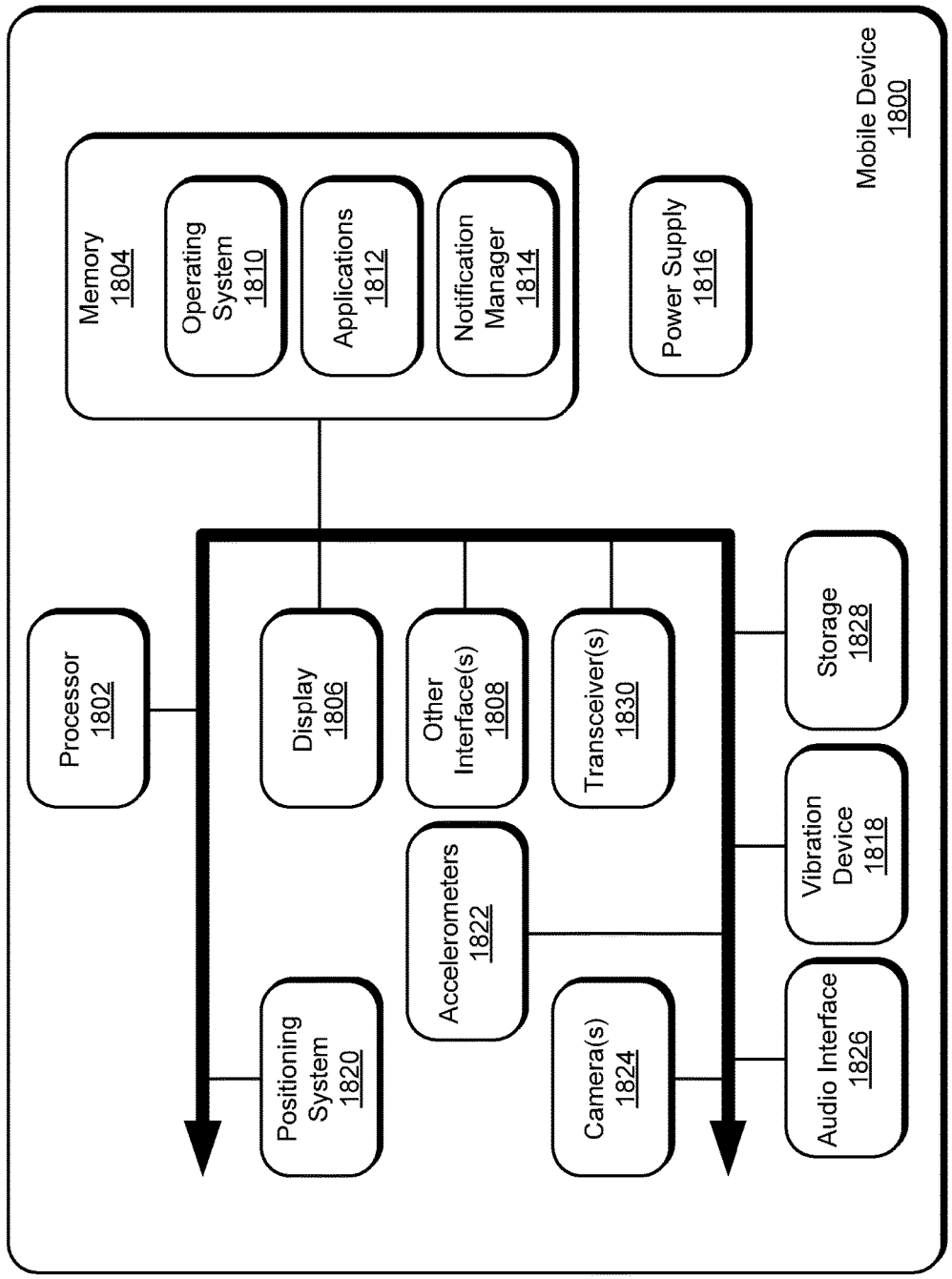
FIG. 18 illustrates another example system that may be useful in implementing the described technology.

FIG. 18 illustrates another example system (labeled as a mobile device 1800) that may be useful in implementing the described technology. The mobile device 1800 includes a processor 1802, a memory 1804, a display 1806 (e.g., a touchscreen display), and other interfaces 1808 (e.g., a keyboard). The memory 1804 generally includes both volatile memory (e.g., RAM) and non-volatile memory (e.g., flash memory). An operating system 1810, such as the Microsoft Windows® Phone operating system, resides in the memory 1804 and is executed by the processor 1802, although it should be understood that other operating systems may be employed.

One or more application programs 1812 are loaded in the memory 1804 and executed on the operating system 1810 by the processor 1802. Examples of applications 1812 include without limitation email programs, scheduling programs, personal information managers, Internet browsing programs, multimedia player applications, etc. A notification manager 1814 is also loaded in the memory 1804 and is executed by the processor 1802 to present notifications to the user. For example, when a communication is received, the notification manager 1814 can cause the mobile device 1800 to beep or vibrate (via the vibration device 1818) and display the notification and/or message content on the display 1806.

The mobile device 1800 includes a power supply 1816, which is powered by one or more batteries or other power sources and which provides power to other components of the mobile device 1800. The power supply 1816 may also be connected to an external power source that overrides or recharges the built-in batteries or other power sources.

The mobile device 1800 includes one or more communication transceivers 1830 to provide network connectivity (e.g., mobile phone network, Wi-Fi®, BlueTooth®, etc.). The mobile device 1800 also includes various other components, such as a positioning system 1820 (e.g., a global positioning satellite transceiver), one or more accelerometers 1822, one or more cameras 1824, an audio interface 1826 (e.g., a microphone, an audio amplifier and speaker and/or audio jack), and additional storage 1828. Other configurations may also be employed.

In an example implementation, a one or more communication services, one or more application services, an abuse service and other engines and services may be embodied by instructions stored in memory 1804 and/or storage devices 1828 and processed by the processing unit 1802. Address books, communication histories, information about a user's social network, and other data may be stored in memory 1804 and/or storage devices 1828 as persistent datastores.

Mobile device 1800 and computer 20 may include a variety of tangible computer-readable storage media and intangible computer-readable communication signals. Tangible computer-readable storage can be embodied by any available media that can be accessed by the mobile device 1800 or the computer 20 and includes both volatile and nonvolatile storage media, removable and non-removable storage media. Tangible computer-readable storage media excludes intangible communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can accessed by mobile device 1800 or computer 20. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal.

Figure 19:
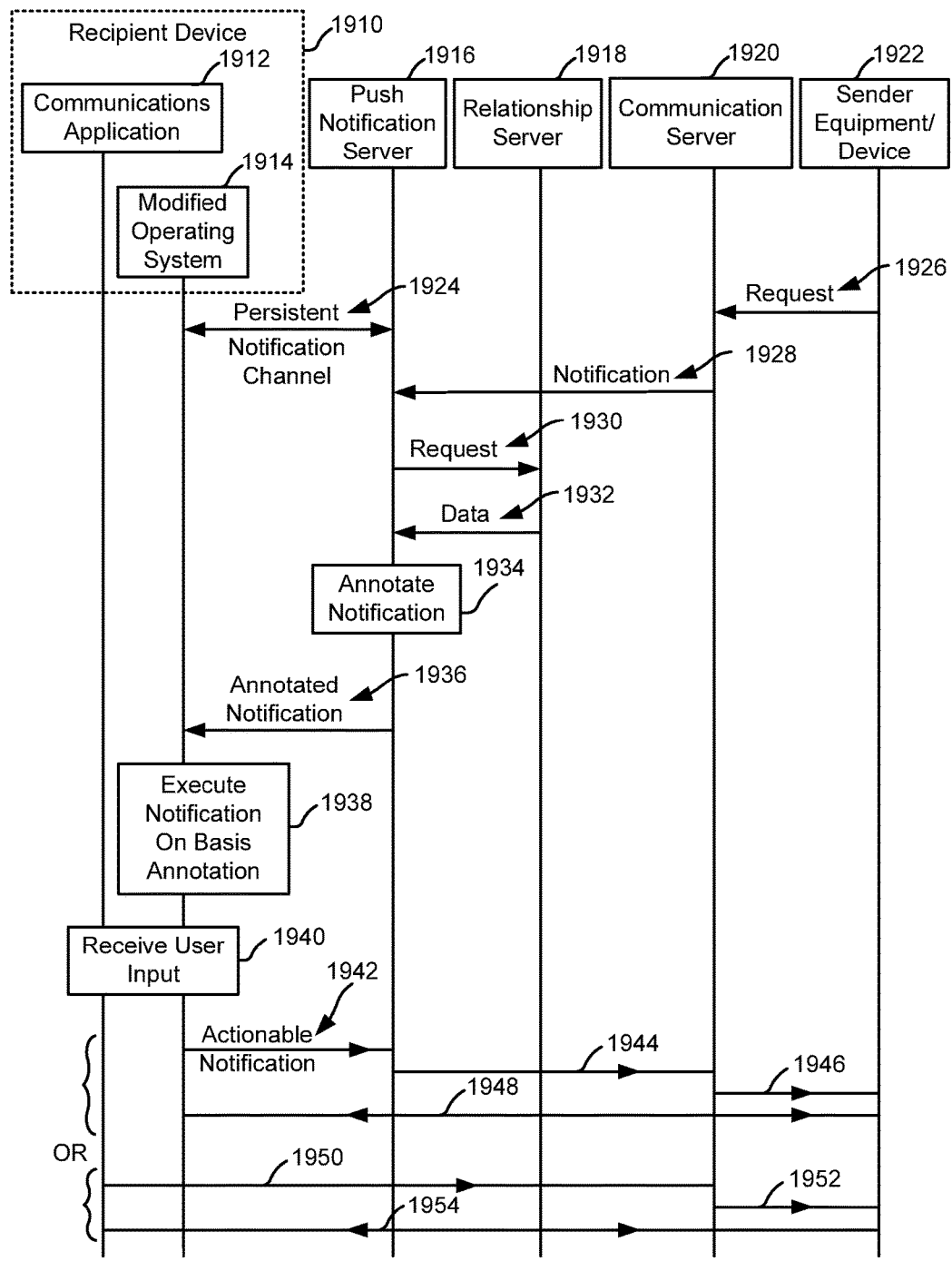
FIG. 19 is a message sequence chart of one or more processes for controlling communications at a recipient device.

FIG. 19 is a message sequence chart of one or more processes for controlling communications at a recipient device (such as video calls, instant messages and others) at a recipient device 1910 (such as a smart phone, tablet computer, or other end user computing equipment). The recipient device 1910 (and/or the sender device 1922) may be resource constrained in terms of having one or more of limited: memory, battery power, computing resource, etc. It should be understood that communication control described herein may be implemented to accommodate resource constraints of the recipient device 1910, the sender device 1922, and/or other devices in the end-to-end communications system.

The recipient device 1910 may comprise a communications application 1912 implemented using software and/or hardware at the recipient device 1910 and arranged to interact with a remote communications server 1920, for example, in the a communication network, storage network, and/or computing network (e.g., the "cloud"). For example, the communications application 1912 may, together with the communications server, provide synchronous communications, such as voice over internet protocol, video calls, instant messaging and others. It is also possible for the communications application 1912 together with the communications server to provide asynchronous communications, such as email, short message service (SMS) and others.

Communications control for the recipient device enables a trade-off between participating in potential new communications and guarding against unwanted communications to be automatically adjusted. This approach is particularly useful for synchronous communications where it is typically more difficult for this trade off to be controlled dynamically due to the immediate nature of the communications. For example, the recipient device 1910 may receive synchronous communication from a sender equipment/device 1922 with which the recipient device 1910 has not previously established synchronous communication. This may be achieved, for example, by sending messages annotated with instructions and/or data to the recipient device. The recipient device is arranged to control its communications behavior on the basis of the annotated messages.

In some examples, the annotated messages are annotated push notifications as now described with reference to FIG. 19. This is especially useful for synchronous communications as it is possible to immediately use an existing, persistent notification channel to send toast messages, update tiles and to send raw data (without the need to open a new communications channel). Even where the communications application is not executing on the recipient device push notifications may be received. This conserves battery power at the recipient device. Having said that, it is not essential to use a push notification server as indicated in FIG. 19. In that case, the communications server 1920 is used to send the annotated messages to the recipient device, by opening a new communications channel with the recipient device.

Where annotated push notifications are used an operating system 1914 at the recipient device may be modified to interpret annotated push notifications so as to control communications behavior at the recipient device resulting in a dynamically controlled trade-off as mentioned above. In some examples the push notifications are actionable push notifications, whereby the operating system of the recipient device may reply to a push notification server. This conserves battery and/or computing resource at the recipient device, for example, where an end user makes input indicating that a requested communication from a sender is to be denied or delayed. That user input may be communicated on the notification channel without the need to open the communications application 1912 at the recipient device 1910.

In another implementation, some or all of the push notification server functionality may be handled by changes by the operating system control in the recipient device 1910 and/or the sender device 1922.

By using a push notification server 1916 in combination with a relationship server 1918 and a communications server 1920, it is possible to take the burden of dynamic control of the trade-off mentioned above away from the recipient device 1910. This is especially useful where the recipient device 1910 is resource-constrained.

The message sequence chart of FIG. 19 represents each of the recipient device 1910, a push notification server 1916, a relationship server 1918, a communications server 1920 and a sender device 1922 as vertical lines on the page. Messages sent between these entities are represented by horizontal arrows where the relative position of the arrows vertically on the page represents chronological order of the messages. The push notification server 1916, relationship server 1918 and communications server 1920 are computer implemented using software and/or hardware. The push notification server 1916, relationship server 1918 and communications server 1920 may be integral with one another, in whole or in part. The sender device 1922 may be a mobile phone, tablet computer or any other end user device capable of communicating with the recipient device 1910 and the communications server 1920.

In the example of FIG. 19, a persistent push notification channel 1924 exists between the recipient device operating system 1914 and a push notification server 1916. The endpoint (such as a URI) of the push notification channel is known to the communications server 1920.

A sender device 1922 desires to make a communication, such as a video call or an instant message communication, with recipient device 1910. The sender device 1922 may not have previously established a synchronous communication with the recipient device 1910. The sender device 1922 sends a request message 1926 to the communications server 1920 to request synchronous communication with recipient device 1910. The communications server 1920 sends a notification message to the endpoint of the persistent notification channel at the push notification server 1916. The push notification server 1916 sends a request 1930 to a relationship server 1918 to request data about any relationship between the sender device and the recipient device. More detail about the relationship server and the data is given below. The relationship server 1918 is part of the relationship service described in the examples below. The relationship server 1918 sends data 1932 to the push notification server about the relationship. The data may be in the form of a numerical score, a rating, thresholds, criteria, rules, raw data or others. The push notification server 1916 annotates 1934 the notification message and forwards the annotated notification message to the recipient device operating system 1914 using the existing persistent notification channel. In this example, the push notification server 1916 retrieves the relationship data and annotates the notification message. However, it is also possible for the communications server to carry out one or both of these steps.

The annotations to the notification message are stored in a payload of the push notification message. The annotations may comprise the relationship data. In some examples, the annotations comprise instructions to be executed by the recipient device operating system 1914. In some examples, the annotations comprise both relationship data and instructions to be executed by the recipient device operating system 1914.

The operating system 1914 of the recipient device 1910 receives the annotated notification message 1936. It extracts the annotation from the payload and recognizes the annotation as being for controlling communications. It executes 1938 the notification on the basis of the annotation. For example, where the annotation comprises relationship data, such as a numerical score, the operating system selects between a plurality of actions on the basis of the score. The actions may depend on whether the communications application 1912 is already executing at the recipient device 1910 or not. For example, where the communications application is not active at the recipient device, the actions may comprise, allowing/disallowing a toast message, allowing a toast message and adding relationship data from the annotation into the toast message, allowing/disallowing an audible alert, allowing/disallowing a tactile alert. For example, where the communications application is active at the recipient device, the actions may comprise sending/not sending the notification message to the application.

As a result of the execution of the notification message, the recipient device 1910 may receive user input 1940. For example, to indicate that the requested communication from sender device 1922 is to be accepted or not. The user input may be communicated to the push notification server 1916 using the persistent notification channel 1924 where the communications application 1912 is not already executing for example. This is shown as actionable notification 1942 in FIG. 19. The push notification server forwards the user input to the communications server 1922 using message 1944. Communications server 1922 informs sender device 1922 using message 1946. A synchronous communications channel (such as a video call or instant messaging channel) may be established between the recipient device 1910 and sender device 1922 as shown by arrow 1948.

Where the communications application 1912 is executing at the recipient device 1910 the communications application 1912 may send a message 1950 to the communications server 1920 using a channel it already has open with the communications server 1920. The communications server 1920 informs the sender device 1922 using message 1952. A communications channel, such as a video channel or instant message channel, may be opened between the recipient device 1910 and the sender device 1922 as shown by arrow 1954.

In an example, a recipient communications device comprises: an operating system arranged to receive an annotated notification message on a persistent notification channel established with a notification server, the notification message comprising a request from a sending device to establish a communication with the recipient communications device; the operating system being arranged to execute the notification message on the basis of the annotation so as to control the requested communication. The requested communication may be a synchronous communication.

In an example, a communications server (or notification server) comprises: a processor arranged to receive a notification message requesting a communication between a sending device and a recipient device; a memory storing data about a relationship between the sending device and the recipient device; the processor being arranged to annotate the notification message using the stored data and to send the annotated notification message to the recipient device.

In another example, annotations to a notification messages may be fetched from the communications service, abuse service, relationship qualification service, and/or push notification service independently or separately from the communication of the notification message or other communications. As such, the payload packaging of communication messages and annotations may take a variety of forms.

The embodiments of the invention described herein are implemented as logical steps in one or more computer systems. The logical operations of the present invention are implemented (1) as a sequence of processor-implemented steps executing in one or more computer systems and (2) as interconnected machine or circuit engines within one or more computer systems. The implementation is a matter of choice, dependent on the performance requirements of the computer system implementing the invention. Accordingly, the logical operations making up the embodiments of the invention described herein are referred to variously as operations, steps, objects, or engines. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in another embodiment without departing from the recited claims.

What is claimed is:

1. A processor-implemented method comprising:
   receiving a communication from a source destined to a recipient, the recipient being capable of receiving the communication at a computing device;
   determining a first relationship type based on a satisfied relationship condition between the source and the recipient;
   sending a notification of the communication to the recipient based on the determined first relationship type, the notification of the communication based on the determined first relationship type being annotated to present a non-content-revealing user interface behavior to the recipient at the computing device and a notification of the communication based on a determined second relationship type being annotated to present a content-revealing user interface behavior to the recipient at the computing device; and
   wherein non-content-revealing user interface behavior instructs the computing device not to reveal content of the communication to the recipient upon receipt of the notification of the communication at the computing device and content-revealing user interface behavior instructs the computing device to reveal content of the communication to the recipient upon receipt of the notification of the communication at the computing device.

2. The processor-implemented method of claim 1 wherein the notification of the communication to the recipient based on the first relationship type further instructs the computing device not to interrupt the recipient upon receipt of the communication at the computing device and the notification of the communication based on the second relationship type further instructs the computing device to interrupt the recipient upon receipt of the communication at the computing device.

3. The processor-implemented method of claim 1 wherein the determining operation comprises:
   determining the first relationship type based on a match of a source identifier in an address book of the recipient.

4. The processor-implemented method of claim 1 wherein the determining operation comprises:
   determining the first relationship type based on verification of a phone number of the source.

5. The processor-implemented method of claim 1 wherein the determining operation comprises:
   determining the first relationship type based on whether the source has a phone number of the recipient in an address book of the source.

6. The processor-implemented method of claim 1 wherein the determining operation comprises:
   determining the first relationship type based on a communication history between the source and the recipient.

7. The processor-implemented method of claim 1 wherein the determining operation comprises:
   determining the first relationship type based on whether the source and the recipient share documents within a document sharing system.

8. The processor-implemented method of claim 1 wherein the determining operation comprises:
   determining the first relationship type based on whether the source and the recipient are on the same physical wired network or within the same private domain.

9. The processor-implemented method of claim 1 wherein the determining operation comprises:
   determining the first relationship type based on a relationship between the source and the recipient within a social network.

10. The processor-implemented method of claim 1 wherein the determining operation comprises:
    determining the first relationship type based on a number of common contacts between the source and the recipient.

11. The processor-implemented method of claim 1 wherein the determining operation comprises:
    determining the first relationship type based on a send-receive ratio attributed to the source.

12. The processor-implemented method of claim 1 wherein the determining operation comprises:
    determining the first relationship type based on a number of other recipients blocking communications from the source.

13. The processor-implemented method of claim 1 carried out at a server, wherein receiving the communication comprises receiving a request for a push notification message to be sent to the recipient on a push notification channel established between the recipient and the communications server.

14. The processor-implemented method of claim 1 comprising annotating the communication with data associated with the first relationship type, the data comprising any one or more of: a score, a user name, an email address, a physical location of the sender, a rating, recipient address book data, a phone number of the source, source address book data, communication history between the source and recipient, document sharing data, communications network address data, social network data.

15. The processor-implemented method of claim 14 where annotating the communication comprises adding the data to a payload of a push notification message.

16. One or more tangible computer-readable storage media storing computer executable instructions for performing a computer process on a computing system wherein the one or more tangible computer-readable storage media are not embodied by intangible communications signals, the computer process comprising:
  receiving a communication from a source destined to a recipient, the recipient being capable of receiving the communication at a computing device;
  determining a first relationship type based on a satisfied relationship condition between the source and the recipient;
  sending a notification of the communication to the recipient based on the determined first relationship type, the notification of the communication based on the determined first relationship type being annotated to present a non-content-revealing user interface behavior to the recipient at the computing device and a notification of the communication based on a second relationship type being annotated to present a content-revealing user interface behavior to the recipient at the computing device; and
  wherein non-content-revealing user interface behavior type instructs the computing device not to reveal content of the communication to the recipient upon receipt of the notification of the communication at the computing device and content-revealing user interface behavior instructs the computing device to reveal content of the communication to the recipient upon receipt of the notification of the communication at the computing device.

17. The one or more tangible computer-readable storage media of claim 16 wherein the notification of the communication to the recipient based on the first relationship type further instructs the computing device not to interrupt the recipient upon receipt of the communication at the computing device and the notification of the communication based on the second relationship type further instructs the computing device to interrupt the recipient upon receipt of the communication at the computing device.

18. A system comprising:
  a source communications interface configured to receive a communication from a source destined to a recipient, the recipient being capable of receiving the communication at a computing device;
  a communications sentry configured to receive the communication from the source communications interface and configured to determine a first relationship type based on a satisfied relationship condition between the source and the recipient; and
  a recipient communications interface configured to receive the communication from the communications sentry and forward a notification of the communication to the recipient based on the determined first relationship type, the notification of the communication based on the determined first relationship type being annotated to present a non-content-revealing user interface behavior to the recipient at the computing device and a notification of the communication based on a second relationship type being annotated to present a content-revealing user interface behavior to the recipient at the computing device, non-content-revealing user interface behavior instructing the computing device not to reveal content of the communication to the recipient upon receipt of the notification of the communication at the computing device and content-revealing user interface behavior instructing the computing device to reveal content of the communication to the recipient upon receipt of the notification of the communication at the computing device.

19. The system of claim 18 wherein the notification of the communication to the recipient based on the determined first relationship type instructs the computing device not to interrupt the recipient upon receipt of the communication at the computing device and the notification of the communication based on the second relationship type instructs the computing device to interrupt the recipient upon receipt of the communication at the computing device.

20. The system of claim 18 wherein the system includes a communications server, the communications server including a push notification server arranged to send the notification of the communication to the recipient as an annotated notification message on a push notification channel between the recipient and the push notification server.

21. The system of claim 18 wherein the system includes a communications server, the communications server being configured to receive a message from the recipient in response to the notification of the communication, the message comprising user input; and establishing a communication channel between the source and the recipient on the basis of the user input.

22. The system of claim 21 wherein the system includes a communications server, the communications server being configured to receive a response message comprising user input in response to the annotated notification message, and to receive the response message on a push notification channel.

* * * * *